(12) United States Patent
Holcomb et al.

(10) Patent No.: US 7,577,200 B2
(45) Date of Patent: Aug. 18, 2009

(54) EXTENDED RANGE VARIABLE LENGTH CODING/DECODING OF DIFFERENTIAL MOTION VECTOR INFORMATION

(75) Inventors: Thomas W. Holcomb, Bothell, WA (US); Sridhar Srinivasan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 976 days.

(21) Appl. No.: 10/960,373

(22) Filed: Oct. 6, 2004

(65) Prior Publication Data

US 2005/0058205 A1  Mar. 17, 2005

Related U.S. Application Data

(63) Continuation-in-part of application No. 10/933,881, filed on Sep. 2, 2004, and a continuation-in-part of application No. 10/857,473, filed on May 27, 2004.

(60) Provisional application No. 60/501,081, filed on Sep. 7, 2003.

(51) Int. Cl.
 *H04N 7/12* (2006.01)
 *H04N 11/02* (2006.01)
 *H04N 11/04* (2006.01)
 *H04B 1/66* (2006.01)

(52) U.S. Cl. ................................. 375/240.16

(58) Field of Classification Search ................................. 375/240.01–240.24
See application file for complete search history.

(56) References Cited

U.S. PATENT DOCUMENTS

| 4,454,546 A | 6/1984 | Mori |
|---|---|---|
| 4,661,849 A | 4/1987 | Hinman |
| 4,661,853 A | 4/1987 | Roeder et al. |
| 4,691,329 A | 9/1987 | Juri et al. |
| 4,695,882 A | 9/1987 | Wada et al. |
| 4,796,087 A | 1/1989 | Guichard et al. |
| 4,800,432 A | 1/1989 | Barnett et al. |
| 4,849,812 A | 7/1989 | Borgers et al. |
| 4,862,267 A | 8/1989 | Gillard et al. |

(Continued)

FOREIGN PATENT DOCUMENTS

EP      0 279 053      8/1988

(Continued)

OTHER PUBLICATIONS

ISO/IEC, "ISO/IEC 11172-2, Information technology—Coding of moving pictures and associated audio for digital storage media at up to about 1,5 Mbit/s—Part 2: Video," 112 pp. (1993).

(Continued)

*Primary Examiner*—Nhon T Diep
(74) *Attorney, Agent, or Firm*—Klarquist Sparkman, LLP

(57) ABSTRACT

Techniques and tools for extended range variable length coding and decoding of differential motion vector information are described. For example, a video decoder determines whether or not to use an extended range variable length decoding mode. When the extended range variable length decoding mode is used, the decoder decodes a differential motion vector in the extended range variable length decoding mode. Otherwise, the decoder decodes the differential motion vector in a default range variable length decoding mode. A video encoder performs corresponding processing.

25 Claims, 18 Drawing Sheets

U.S. PATENT DOCUMENTS

| | | | |
|---|---|---|---|
| 4,864,393 A | 9/1989 | Harradine et al. | |
| 4,999,705 A | 3/1991 | Puri | |
| 5,021,879 A | 6/1991 | Vogel | |
| 5,068,724 A | 11/1991 | Krause et al. | |
| 5,089,887 A | 2/1992 | Robert et al. | |
| 5,091,782 A | 2/1992 | Krause et al. | |
| 5,103,306 A | 4/1992 | Weiman et al. | |
| 5,105,271 A * | 4/1992 | Niihara | 375/240.16 |
| 5,117,287 A | 5/1992 | Koike et al. | |
| 5,155,594 A | 10/1992 | Bernstein et al. | |
| 5,157,490 A | 10/1992 | Kawai et al. | |
| 5,175,618 A | 12/1992 | Ueda | |
| 5,223,949 A | 6/1993 | Honjo | |
| 5,258,836 A | 11/1993 | Murata | |
| 5,274,453 A | 12/1993 | Maeda | |
| 5,298,991 A | 3/1994 | Yagasaki et al. | |
| 5,319,463 A | 6/1994 | Hongu et al. | |
| 5,376,971 A | 12/1994 | Kadono et al. | |
| 5,379,351 A | 1/1995 | Fandrianto et al. | |
| 5,400,075 A | 3/1995 | Savatier | |
| 5,412,430 A | 5/1995 | Nagata | |
| RE34,965 E | 6/1995 | Sugiyama | |
| 5,422,676 A | 6/1995 | Herpel et al. | |
| 5,424,779 A | 6/1995 | Odaka | |
| 5,428,396 A * | 6/1995 | Yagasaki et al. | 375/240.16 |
| 5,442,400 A | 8/1995 | Sun | |
| 5,448,297 A | 9/1995 | Alattar et al. | |
| 5,457,495 A | 10/1995 | Hartung | |
| 5,461,421 A | 10/1995 | Moon | |
| RE35,093 E | 11/1995 | Wang et al. | |
| 5,465,118 A | 11/1995 | Hancock et al. | |
| 5,467,086 A | 11/1995 | Jeong | |
| 5,467,136 A | 11/1995 | Odaka | |
| 5,477,272 A | 12/1995 | Zhang | |
| RE35,158 E | 2/1996 | Sugiyama | |
| 5,491,523 A | 2/1996 | Sato | |
| 5,510,840 A | 4/1996 | Yonemitsu et al. | |
| 5,517,327 A | 5/1996 | Nakatani et al. | |
| 5,539,466 A | 7/1996 | Igarashi et al. | |
| 5,544,286 A | 8/1996 | Laney | |
| 5,546,129 A | 8/1996 | Lee | |
| 5,550,541 A | 8/1996 | Todd | |
| 5,552,832 A | 9/1996 | Astle | |
| 5,565,922 A | 10/1996 | Krause | |
| 5,594,504 A | 1/1997 | Ebrahimi | |
| 5,594,813 A | 1/1997 | Fandrianto et al. | |
| 5,598,215 A | 1/1997 | Watanabe | |
| 5,598,216 A | 1/1997 | Lee | |
| 5,617,144 A | 4/1997 | Lee | |
| 5,619,281 A | 4/1997 | Jung | |
| 5,623,311 A | 4/1997 | Phillips et al. | |
| 5,654,771 A | 8/1997 | Tekalp et al. | |
| 5,659,365 A | 8/1997 | Wilkinson | |
| 5,666,461 A | 9/1997 | Igarashi et al. | |
| 5,668,608 A | 9/1997 | Lee | |
| 5,668,932 A | 9/1997 | Laney | |
| 5,689,306 A | 11/1997 | Jung | |
| 5,692,063 A | 11/1997 | Lee et al. | |
| 5,699,476 A | 12/1997 | Van Der Meer | |
| 5,701,164 A | 12/1997 | Kato | |
| 5,715,005 A | 2/1998 | Masaki | |
| 5,748,789 A | 5/1998 | Lee et al. | |
| 5,784,175 A | 7/1998 | Lee | |
| 5,786,860 A | 7/1998 | Kim et al. | |
| 5,787,203 A | 7/1998 | Lee et al. | |
| 5,793,897 A | 8/1998 | Jo et al. | |
| 5,796,855 A | 8/1998 | Lee | |
| 5,799,113 A | 8/1998 | Lee | |
| RE35,910 E | 9/1998 | Nagata et al. | |
| 5,825,830 A | 10/1998 | Kopf | |
| 5,825,929 A | 10/1998 | Chen et al. | |
| 5,835,144 A | 11/1998 | Matsumura et al. | |
| 5,835,149 A | 11/1998 | Astle | |
| 5,844,613 A | 12/1998 | Chaddha | |
| 5,847,776 A | 12/1998 | Khmelnitsky | |
| 5,874,995 A | 2/1999 | Naimpally et al. | |
| 5,901,248 A | 5/1999 | Fandrianto et al. | |
| 5,929,940 A | 7/1999 | Jeannin | |
| 5,946,042 A | 8/1999 | Kato | |
| 5,946,043 A | 8/1999 | Lee et al. | |
| 5,949,489 A | 9/1999 | Nishikawa et al. | |
| 5,959,673 A | 9/1999 | Lee | |
| 5,963,258 A | 10/1999 | Nishikawa et al. | |
| 5,963,259 A | 10/1999 | Nakaya et al. | |
| 5,963,673 A | 10/1999 | Kodama et al. | |
| 5,970,173 A | 10/1999 | Lee et al. | |
| 5,970,175 A | 10/1999 | Nishikawa et al. | |
| 5,973,743 A | 10/1999 | Han | |
| 5,973,755 A | 10/1999 | Gabriel | |
| 5,982,437 A | 11/1999 | Okazaki et al. | |
| 5,982,438 A | 11/1999 | Lin et al. | |
| 5,990,960 A | 11/1999 | Murakami et al. | |
| 5,991,447 A | 11/1999 | Eifrig et al. | |
| 6,002,439 A | 12/1999 | Murakami et al. | |
| 6,005,980 A | 12/1999 | Eifrig et al. | |
| RE36,507 E | 1/2000 | Iu | |
| 6,011,596 A | 1/2000 | Burl | |
| 6,026,195 A | 2/2000 | Eifrig et al. | |
| 6,035,070 A | 3/2000 | Moon et al. | |
| 6,040,863 A | 3/2000 | Kato | |
| 6,052,150 A | 4/2000 | Kikuchi | |
| 6,058,212 A | 5/2000 | Yokoyama | |
| 6,067,322 A | 5/2000 | Wang | |
| 6,094,225 A | 7/2000 | Han | |
| RE36,822 E | 8/2000 | Sugiyama | |
| 6,097,759 A | 8/2000 | Murakami et al. | |
| 6,111,914 A | 8/2000 | Bist | |
| 6,130,963 A | 10/2000 | Uz et al. | |
| 6,148,027 A | 11/2000 | Song et al. | |
| 6,148,033 A | 11/2000 | Pearlstein et al. | |
| 6,154,495 A | 11/2000 | Yamaguchi et al. | |
| 6,188,725 B1 | 2/2001 | Sugiyama | |
| 6,188,794 B1 | 2/2001 | Nishikawa et al. | |
| 6,201,927 B1 | 3/2001 | Comer | |
| 6,205,176 B1 | 3/2001 | Sugiyama | |
| 6,208,761 B1 | 3/2001 | Passagio et al. | |
| 6,215,905 B1 | 4/2001 | Lee et al. | |
| 6,219,070 B1 | 4/2001 | Baker et al. | |
| 6,219,464 B1 | 4/2001 | Greggain et al. | |
| 6,233,017 B1 | 5/2001 | Chaddha | |
| RE37,222 E | 6/2001 | Yonemitsu | |
| 6,243,418 B1 | 6/2001 | Kim | |
| 6,259,741 B1 | 7/2001 | Chen et al. | |
| 6,263,024 B1 | 7/2001 | Matsumoto | |
| 6,266,091 B1 | 7/2001 | Saha et al. | |
| 6,271,885 B2 | 8/2001 | Sugiyama | |
| 6,275,531 B1 | 8/2001 | Li | |
| 6,281,942 B1 | 8/2001 | Wang | |
| 6,282,243 B1 | 8/2001 | Kazui et al. | |
| 6,289,049 B1 | 9/2001 | Kim et al. | |
| 6,292,585 B1 | 9/2001 | Yamaguchi et al. | |
| 6,295,376 B1 | 9/2001 | Nakaya | |
| 6,307,887 B1 | 10/2001 | Gabriel | |
| 6,307,973 B2 | 10/2001 | Nishikawa et al. | |
| 6,310,918 B1 | 10/2001 | Saha et al. | |
| 6,320,593 B1 | 11/2001 | Sobel et al. | |
| 6,324,216 B1 | 11/2001 | Igarashi | |
| 6,337,881 B1 | 1/2002 | Chaddha | |
| 6,339,656 B1 | 1/2002 | Marui | |
| 6,377,628 B1 | 4/2002 | Schultz et al. | |
| 6,381,279 B1 | 4/2002 | Taubman | |
| 6,396,876 B1 | 5/2002 | Babonneau et al. | |
| 6,404,813 B1 | 6/2002 | Haskell et al. | |
| 6,418,166 B1 | 7/2002 | Wu et al. | |

| | | | |
|---|---|---|---|
| 6,430,316 B1 | 8/2002 | Wilkinson | |
| 6,441,842 B1 | 8/2002 | Fandrianto et al. | |
| 6,496,608 B1 | 12/2002 | Chui | |
| 6,529,632 B1 | 3/2003 | Nakaya et al. | |
| 6,539,056 B1 | 3/2003 | Sato et al. | |
| 6,563,953 B2 | 5/2003 | Lin et al. | |
| 6,647,061 B1 | 11/2003 | Panusopone et al. | |
| 6,650,781 B2 | 11/2003 | Nakaya | |
| 6,661,470 B1 | 12/2003 | Kawakami et al. | |
| 6,728,317 B1 | 4/2004 | Demos | |
| RE38,563 E | 8/2004 | Eifrig et al. | |
| 6,950,469 B2 | 9/2005 | Karczewicz et al. | |
| 6,968,008 B1 | 11/2005 | Ribas-Corbera et al. | |
| 6,980,596 B2 * | 12/2005 | Wang et al. | 375/240.16 |
| 6,983,018 B1 | 1/2006 | Lin et al. | |
| 7,023,919 B2 | 4/2006 | Cho et al. | |
| 2001/0050957 A1 | 12/2001 | Nakaya et al. | |
| 2002/0186890 A1 | 12/2002 | Lee et al. | |
| 2003/0095603 A1 | 5/2003 | Lan et al. | |
| 2003/0099292 A1 | 5/2003 | Wang et al. | |
| 2003/0112864 A1 | 6/2003 | Karczewicz et al. | |
| 2003/0113026 A1 | 6/2003 | Srinivasan et al. | |
| 2003/0142748 A1 | 7/2003 | Tourapis | |
| 2003/0152146 A1 | 8/2003 | Lin et al. | |
| 2003/0156646 A1 | 8/2003 | Hsu et al. | |
| 2003/0202705 A1 | 10/2003 | Sun | |
| 2005/0013497 A1 | 1/2005 | Hsu et al. | |
| 2005/0013498 A1 | 1/2005 | Srinivasan | |
| 2005/0036700 A1 | 2/2005 | Nakaya | |
| 2005/0036759 A1 | 2/2005 | Lin et al. | |
| 2005/0100093 A1 | 5/2005 | Holcomb | |
| 2005/0226335 A1 | 10/2005 | Lee et al. | |
| 2006/0013307 A1 | 1/2006 | Olivier et al. | |

FOREIGN PATENT DOCUMENTS

| | | |
|---|---|---|
| EP | 0 397 402 | 11/1990 |
| EP | 0 526 163 | 2/1993 |
| EP | 0 535 746 | 4/1993 |
| EP | 0535746 | 4/1993 |
| EP | 0 540 350 | 5/1993 |
| EP | 0 588 653 | 3/1994 |
| EP | 0 614 318 | 9/1994 |
| EP | 0 625 853 | 11/1994 |
| EP | 0 651 574 | 5/1995 |
| EP | 0 771 114 | 5/1997 |
| EP | 0 786 907 | 7/1997 |
| EP | 0 825 778 | 2/1998 |
| EP | 0 830 029 | 3/1998 |
| EP | 0 884 912 | 12/1998 |
| EP | 0 944 245 | 9/1999 |
| GB | 2328337 | 2/1999 |
| GB | 2343579 | 5/2000 |
| JP | 61205086 | 9/1986 |
| JP | 62 213 494 | 9/1987 |
| JP | 3001688 | 1/1991 |
| JP | 3 129 986 | 3/1991 |
| JP | 6 078 295 | 3/1994 |
| JP | 6 078 298 | 3/1994 |
| JP | 06-276481 | 9/1994 |
| JP | 06-276511 | 9/1994 |
| JP | 6292188 | 10/1994 |
| JP | 7-274171 | 10/1995 |
| JP | 08-140099 | 5/1996 |
| JP | 09-322163 | 12/1997 |
| JP | 10 056 644 | 2/1998 |
| WO | WO 00/33581 | 8/2000 |
| WO | WO 03/026296 | 3/2003 |

OTHER PUBLICATIONS

ISO/IEC, "JTC1/SC29/WG11 N2202, Information Technology—Coding of Audio-Visual Objects: Visual, ISO/IEC 14496-2," 329 pp. (1998).

ITU-T, "ITU-T Recommendation H.261, Video Codec for Audiovisual Services at px64 kbits," 25 pp. (1993).

ITU-T, "ITU-T Recommendation H.262, Information Technology—Generic Coding of Moving Pictures and Associated Audio Information: Video," 205 pp. (1995).

ITU-T, "ITU-T Recommendation H.263, Video coding for low bit rate communication," 162 pp. (1998).

Joint Video Team (JVT) of ISO/IEC MPEG & ITU-T VCEG, "Joint Final Committee Draft (JFCD) of Joint Video Specification," JVT-D157, 207 pp. (Aug. 2002).

Microsoft Corporation, "Microsoft Debuts New Windows Media Player 9 Series, Redefining Digital Media on the PC," 4 pp. (Sep. 4, 2002) [Downloaded from the World Wide Web on May 14, 2004].

Mook, "Next-Gen Windows Media Player Leaks to the Web," *BetaNews*, 17 pp. (Jul. 2002) [Downloaded from the World Wide Web on Aug. 8, 2003].

U.S. Appl. No. 60/341,674, filed Dec. 17, 2001, Lee et al.

U.S. Appl. No. 60/488,710, filed Jul. 18, 2003, Srinivasan et al.

U.S. Appl. No. 60/501,081, filed Sep. 7, 2003, Srinivasan et al.

U.S. Appl. No. 60/501,133, filed Sep. 7, 2003, Holcomb et al.

Yu et al., "Two-Dimensional Motion Vector Coding for Low Bitrate Videophone Applications," *Proc. Int'l Conf. on Image Processing*, Los Alamitos, US, pp. 414-417, IEEE Comp. Soc. Press (1995).

Reader, "History of MPEG Video Compression—Ver. 4.0," 99 pp., document marked Dec. 16, 2003.

Printouts of FTP directories from http://ftp3.itu.ch, 8 pp. (downloaded from the World Wide Web on Sep. 20, 2005.).

Bartkowiak et al., "Color Video compression Based on Chrominance Vector Quantization," 7th Int'l Workshop on Systems, Signals and Image Processing, IWSSIP 2000, Maribor 7-9 VI, pp. 107-110 (2000).

Benzler et al., "Improving multiresolution motion compensating hybrid coding by drift reduction," Picture Coding Symposium, 4 pp. (1996).

Benzler et al., "Motion and aliasing compensating prediction with quarter-pel accuracy and adaptive overlapping blocks as proposal for MPEG-4 tool evaluation—Technical description," ISO/IEC JTC1/SC29/WG11, MPEG 95/0552, 5 pp. (document marked 1995).

Benzler, "Results of core experiments P8 (Motion and Aliasing Compensating Prediction)," ISO/IEC JTC1/SC29/WG11, MPEG 97/2625, 8 pp. (document marked 1997).

Borman et al., "Block-matching Sub-pixel Motion Estimation from Noisy, Under-Sampled Frames—an Empirical Performance Evaluation," SPIE Visual Comm. & Image Processing, 10 pp. (1999).

Conklin et al., "Multi-resolution Motion Estimation," Proc. ICASSP '97, Munich, Germany, 4 pp. (1997).

Davis et al., "Equivalence of subpixel motion estimators based on optical flow and block matching," Proc. IEEE Int'l Symposium on Computer Vision, pp. 7-12 (1995).

de Haan et al., "Sub-pixel motion estimation with 3-D recursive search block-matching," Signal Processing: Image Comm. 6, pp. 229-239 (1994).

"DivX Multi Standard Video Encoder," 2 pp. (Downloaded from the World Wide Web on Jan. 24, 2006).

Ericsson, "Fixed and Adaptive Predictors for Hybrid Predictive/Transform Coding," IEEE Transactions on Comm., vol. COM-33, No. 12, pp. 1291-1302 (1985).

Flierl et al., "Multihypothesis Motion Estimation for Video Coding," Proc. DCC, 10 pp. (Mar. 2001).

Fogg, "Survey of Software and Hardware VLC Architectures," SPIE, vol. 2186, pp. 29-37 (Feb. 9-10, 1994).

Girod, "Efficiency Analysis of Multihypothesis Motion-Compensated Prediction for Video Coding," IEEE Transactions on Image Processing, vol. 9, No. 2, pp. 173-183 (Feb. 2000).

Girod, "Motion-Compensating Prediction with Fractional-Pel Accuracy," IEEE Transactions on Comm., vol. 41, No. 4, pp. 604-612 (1993).

Girod, "Motion Compensation: Visual Aspects, Accuracy, and Fundamental Limits," Motion Analysis and Image Sequence Processing, Kluwer Academic Publishers, pp. 125-152 (1993).

Horn et al., "Estimation of Motion Vector Fields for Multiscale Motion Compensation," Proc. Picture Coding Symp. (PCS 97), pp. 141-144 (Sep. 1997).

Hsu et al., "A Low Bit-Rate Video Codec Based on Two-Dimensional Mesh Motion Compensation with Adaptive Interpolation," IEEE Transactions on Circuits and Systems for Video Technology, vol. II, No. 1, pp. 111-117 (Jan. 2001).

IBM Technical Disclosure Bulletin, "Advanced Motion Estimation for Moving Picture Expert Group Encoders," vol. 39, No. 4, pp. 323-324 (Apr. 1996).

ISO/IEC, "MPEG-4 Video Verification Model Version 10.0," ISO/IEC JTC1/SC29/WG11, MPEG98/N1992, (ed. Ebrahimi) (document marked Feb. 1998).

ITU—Q15-F-24, "MVC Video Codec—Proposal for H.26L," Study Group 16, Video Coding Experts Group (Question 15), 28 pp. (document marked as generated in 1998).

ITU-T, "H.26L Test Model Long Term No. 5 (TML-5) draft0," Study Group 16, Video Coding Experts Group (Question 15), Document Q15-K-59, 35 pp. (ed. Gisle Bjontegaard) (Document dated Oct. 2000).

Iwahashi et al., "A Motion Compensation Technique for Downscaled Pictures in Layered Coding," IEICE Transactions on Comm., vol. E77-B, No. 8, pp. 1007-1012 (Aug. 1994).

Jeong et al., "Adaptive Huffman Coding of 2-D DCT Coefficients for Image Sequence Compression," Signal Processing: Image Communication, vol. 7, 11 pp. (1995).

Joint Video Team (JVT) of ISO/IEC MPEG and ITU-T VCEG, "Joint Model No. 1, Revision 1 (JM-1r1)," JVT-A003r1, Pattaya, Thailand, 80 pp. (Dec. 2001) [document marked "Generated: Jan. 18, 2002"].

Joint Video Team (JVT) of ISO/IEC MPEG and ITU-T VCEG, "Joint Committee Draft (CD)," JVT-C167, 3rd Meeting: Fairfax, Virginia, USA, 142 pp. (May 2002).

Keys, "Cubic Convolution Interpolation for Digital Image Processing," IEEE Transactions on Acoustics, Speech & Signal Processing, vol. ASSP-29, No. 6, pp. 1153-1160 (1981).

Konrad et al., "On Motion Modeling and Estimation for Very Low Bit Rate Video Coding," Visual Comm. & Image Processing (VCIP '95), 12 pp. (May 1995).

Kossentini et al., "Predictive RD Optimized Motion Estimation for Very Low Bit-rate Video Coding," IEEE J. on Selected Areas in Communications, vol. 15, No. 9 pp. 1752-1763 (Dec. 1997).

Lopes et al., "Analysis of Spatial Transform Motion Estimation with Overlapped Compensation and Fractional-pixel Accuracy," IEEE Proc. Visual Image Signal Processing, vol. 146, No. 6, pp. 339-344 (Dec. 1999).

Morimoto et al., "Fast Electronic Digital Image Stabilization," Proc. ICPR, Vienna, Austria, 5 pp. (1996).

"Overview of MPEG-2 Test Model 5," 5 pp. [Downloaded from the World Wide Web on Mar. 1, 2006].

Ribas-Corbera et al., "On the Optimal Block Size for Block-based Motion-Compensated Video Coders," SPIE Proc. of Visual Comm. & Image Processing, vol. 3024, 12 pp. (1997).

Ribas-Corbera et al., "On the Optimal Motion Vector Accuracy for Block-based Motion-Compensated Video Coders," Proc. SPIE Digital Video Compression, San Jose, CA, 13 pp. (1996).

Schultz et al., "Subpixel Motion Estimation for Super-Resolution Image Sequence Enhancement," Journal of Visual Comm. & Image Representation, vol. 9, No. 1, pp. 38-50 (Mar. 1998).

Sullivan et al., "The H.264/AVC Advanced Video Coding Standard: Overview and Introduction to the Fidelity Range Extensions," 21 pp. (Aug. 2004).

"The TML Project WEB-Page and Archive," (including pages of code marked "image.cpp for H.26L decoder, Copyright 1999" and "image.c"), 24 pp. [Downloaded from the World Wide Web on Jun. 1, 2005].

Triggs, "Empirical Filter Estimation for Subpixel Interpolation and Matching," Int'l Conf. Computer Vision '01, Vancouver, Canada, 8 pp. (Jul. 2001).

Triggs, "Optimal Filters for Subpixel Interpolation and Matching," Int'l Conf. Computer Vision '01, Vancouver, Canada, 10 pp. (Jul. 2001).

"Video Coding Using Wavelet Decomposition for Very Low Bit-Rate Networks," 16 pp. (1997).

Wang et al., "Interlace Coding Tools for H.26L Video Coding," ITU-T SG16/Q.6 VCEG-O37, pp. 1-20 (Dec. 2001).

Wedi, "Complexity Reduced Motion Compensated Prediction with 1/8-pel Displacement Vector Resolution," ITU Study Group 16, Video Coding Experts Group (Question 6), Document VCEG-L20, 8 pp. (Document dated Dec. 2000).

Weiss et al., "Real Time Implementation of Subpixel Motion Estimation for Broadcast Applications," pp. 7/1-7/3 (1990).

Wiegand et al., "Long-term Memory Motion Compensated Prediction," IEEE Transactions on Circuits & Systems for Video Technology, vol. 9, No. 1, pp. 70-84 (Feb. 1999).

Wien, "Variable Block-Size Transforms for Hybrid Video Coding," Dissertation, 182 pp. (Feb. 2004).

Wu et al., "Joint estimation of forward and backward motion vectors for interpolative prediction of video," IEEE Transactions on Image Processing, vol. 3, No. 5, pp. 684-687 (Sep. 1994).

Yang et al., "Very High Efficiency VLSI Chip-pair for Full Search Block Matching with Fractional Precision," Proc. ICASSP/IEEE Int'l Conf. on Acoustics, Speech & Signal Processing, Glasgow, pp. 2437-2440 (May 1989).

Zhang et al., "Adaptive Field/Frame Selection for High Compression Coding," MERL TR-2003-29, 13 pp. (Jan. 2003).

* cited by examiner

Figure 1A, prior art

```
index = vlc_decode()      // Use the Huffman table indicated by MVTAB in the
picture layer
index = index + 1
if (index >= 37)
{
      last_flag = 1
      index = index - 37
}
else
      last_flag = 0 intra_flag = 0
if (index == 0)
{
      dmv_x = 0
      dmv_y = 0
}
else if (index == 35)
{
      dmv_x = get_bits(k_x - halfpel_flag)
      dmv_y = get_bits(k_y - halfpel_flag)
}
else if (index == 36)
{
      intra_flag = 1
      dmv_x = 0
      dmv_y = 0
}
else
{
   index1 = index % 6
   if (halfpel_flag == 1 && index1 == 5)
      hpel = 1
    else
      hpel = 0
   val = get_bits (size_table[index1] - hpel)
   sign = 0 - (val & 1)
   dmv_x = sign ^ ((val >> 1) + offset_table[index1])
   dmv_x = dmv_x - sign index1 = index / 6
   if (halfpel_flag == 1 && index1 == 5)
      hpel = 1
    else
      hpel = 0
   val = get_bits (size_table[index1] - hpel)
   sign = 0 - (val & 1)
   dmv_y = sign ^ ((val >> 1) + offset_table[index1])
   dmv_y = dmv_y- sign
}
```

Figure 1B, prior art

| MVRANGE | k_x | k_y | range_x | range_y |
|---|---|---|---|---|
| 0 (default) | 9 | 8 | 256 | 128 |
| 10 | 10 | 9 | 512 | 256 |
| 110 | 12 | 10 | 2048 | 512 |
| 111 | 13 | 11 | 4096 | 1024 |

Software 280 implementing video encoder and/or decoder with optional extended range variable length coding and/or decoding of differential motion vectors

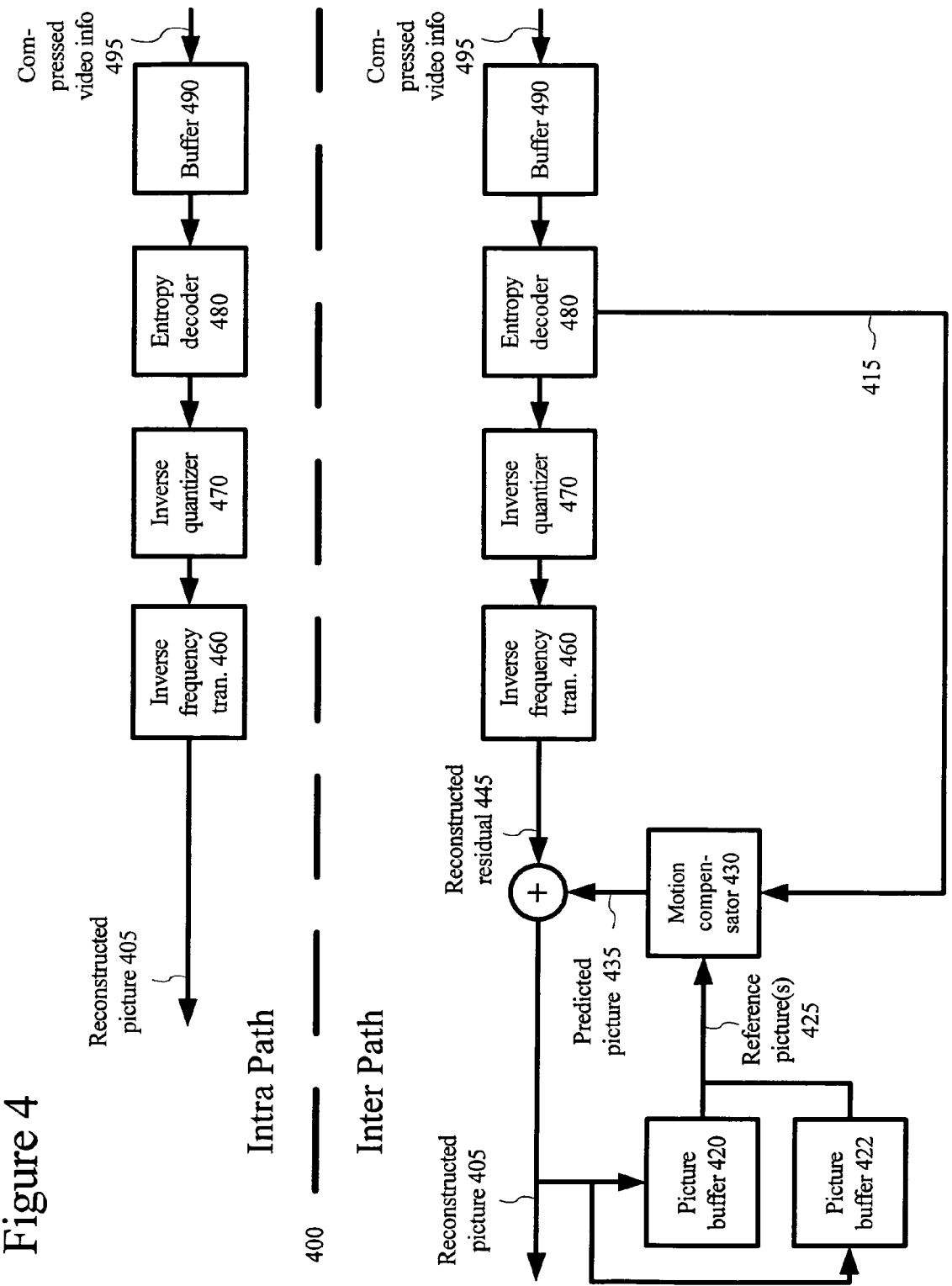

Figure 5

```
Coding a DMVX, DMVY motion vector differential pair:
Horizontal Range is -RX to +RX - 1:
Vertical Range is -RY to + RY - 1
Absolute value of RX = 2^MX
Absolute value of RY = 2^MY
AX = absolute value of DMVX
AY = absolute value of DMVY
SX = sign of DMVX: SX = 1 if DMVX < 0 and SX = 0 if DMVX is greater than
or equal to 0
SY = sign of DMVY: SY = 1 if DMVY < 0 and SY = 0 if DMVY is greater than
or equal to 0
ESCX = 2^KX
ESCY = 2^KY
If (AX > ESCX or AY > ESCY)
{
    SendBits (VLC_CODE [ESCAPE], VLC_SIZE [ESCAPE])
    SendBits (DMVX, MX+1)
    SendBits (DMVY, MY+1)
}
Else
{
    SendBits (VLC_CODE [NX, NY], VLC_SIZE [NX, NY])
    SendBits (AX, NX)
    SendBits (SX, 1)
    SendBits (AY NY)
    SendBits (SY, 1)
}
```

Figure 6A

```
index = vlc_decode()     // Use the Huffman table indicated by MVTAB in
the picture layer
if (index == 0) {
      dmv_x = 1 - 2 * get_bits(1)
      dmv_y = 0
}
if (index == 125)
{
      dmv_x = get_bits(k_x - halfpel_flag)
      dmv_y = get_bits(k_y - halfpel_flag)
}
else
{
   index1 = (index + 1) % 9
      val = get_bits (index1)
      sign = 0 - (val & 1)
      dmv_x = sign ^ ((val >> 1) + offset_table[index1])
      dmv_x = dmv_x - sign index1 = (index + 1) / 9
      val = get_bits (index1)
      sign = 0 - (val & 1)
      dmv_y = sign ^ ((val >> 1) + offset_table[index1])
      dmv_y = dmv_y - sign
}
```

Figure 6B

| MVRANGE | k_x | k_y | range_x | range_y |
|---|---|---|---|---|
| 0 (default) | 9 | 8 | 256 | 128 |
| 10 | 10 | 9 | 512 | 256 |
| 110 | 12 | 10 | 2048 | 512 |
| 111 | 13 | 11 | 4096 | 1024 |

Figure 6C

```
index = vlc_decode()    // Use the Huffman table indicated by MVTAB in
the picture layer
if (index == 0) {
      dmv_x = 1 - 2 * get_bits(1)
      dmv_y = 0
      predictor_flag = 0
}
if (index == 125)
{
      dmv_x = get_bits(k_x - halfpel_flag)
      dmv_y = get_bits(k_y - halfpel_flag)
      predictor_flag = dmv_y & 1
      dmv_y = dmv_y >> 1
}
else
{
    index1 = (index + 1) % 9
        val = get_bits (index1)
        sign = 0 - (val & 1)
        dmv_x = sign ^ ((val >> 1) + offset_table[index1])
        dmv_x = dmv_x - sign index1 = (index + 1) / 9
        val = get_bits (size_table[index1])
        sign = 0 - (val & 1)
        dmv_y = sign ^ ((val >> 1) + offset_table[index1])
        dmv_y = dmv_y - sign
        predictor_flag = index1 & 1
}
```

Figure 7

```
Coding a DMVX, DMVY motion vector differential pair:
Horizontal Range is -RX to +RX - 1:
Vertical Range is -RY to + RY - 1
Absolute value of RX = 2^MX
Absolute value of RY = 2^MY
AX = absolute value of DMVX
AY = absolute value of DMVY
SX = sign of DMVX: SX = 1 if DMVX < 0 and SX = 0 if DMVX is greater than
or equal to 0
SY = sign of DMVY: SY = 1 if DMVY < 0 and SY = 0 if DMVY is greater than
or equal to 0
ESCX = 2^(KX+EX)
ESCY = 2^(KY+EY)
If (AX > ESCX or AY > ESCY)
{
    SendBits (VLC_CODE [ESCAPE], VLC_SIZE [ESCAPE])
    SendBits (DMVX, MX+1)
    SendBits (DMVY, MY+1)
}
Else
{
    SendBits (VLC_CODE [NX, NY], VLC_SIZE [NX, NY])
    SendBits (AX, NX+EX)
    SendBits (SX, 1)
    SendBits (AY NY+EY)
    SendBits (SY, 1)
}
```

Macroblock Layer Interlace P-field Bitstream Syntax

Figure 11A

| FCM | Picture Coding Type |
|---|---|
| 0 | Progressive |
| 10 | Frame-Interlace |
| 11 | Field-Interlace |

Figure 11B

| FPTYPE FLC | First Field Picture Type | Second Field Picture Type |
|---|---|---|
| 000 | I | I |
| 001 | I | P |
| 010 | P | I |
| 011 | P | P |
| 100 | B | B |
| 101 | B | BI |
| 110 | BI | B |
| 111 | BI | BI |

Figure 11C

| Extended Horizontal Differential MV Range | Extended Vertical Differential MV Range | VLC (Binary) | VLC Size |
|---|---|---|---|
| No | No | 0 | 1 |
| Yes | No | 10 | 2 |
| No | Yes | 110 | 3 |
| Yes | Yes | 111 | 3 |

Figure 12A

```
index = vlc_decode()     // Use the table indicated by MVTAB in the
picture layer
if (index == 71)
{
    dmv_x = get_bits(k_x)
    dmv_y = get_bits(k_y)
}
else
{
      if (extend_x == 1)
    offset_table = offset_table2
      else
    offset_table = offset_table1
    index1 = (index + 1) % 9
      if (index1 != 0)
      {
          val = get_bits (index1 + extend_x)
          sign = 0 - (val & 1)
          dmv_x = sign ^ ((val >> 1) + offset_table[index1])
          dmv_x = dmv_x - sign
      }
      else
          dmv_x = 0 if (extend_y == 1)
    offset_table = offset_table2
      else
    offset_table = offset_table1
    index1 = (index + 1) / 9
      if (index1 != 0)
      {
          val = get_bits (index1 + extend_y)
          sign = 0 - (val & 1)
          dmv_y = sign ^ ((val >> 1) + offset_table[index1])
          dmv_y = dmv_y - sign
      }
      else
          dmv_y = 0
}
```

Figure 12B

| MVRANGE | k_x | k_y | range_x | range_y |
|---|---|---|---|---|
| 0 (default) | 9 | 8 | 256 | 128 |
| 10 | 10 | 9 | 512 | 256 |
| 110 | 12 | 10 | 2048 | 512 |
| 111 | 13 | 11 | 4096 | 1024 |

Figure 12C

```
index = vlc_decode()     // Use the table indicated by MVTAB in the
picture layer
if (index == 125)
{
      dmv_x = get_bits(k_x)
      dmv_y = get_bits(k_y)
      predictor_flag = dmv_y & 1
      dmv_y = (dmv_y + predictor_flag) >> 1
}
else
{
        if (extend_x == 1)
      offset_table = offset_table2
        else
      offset_table = offset_table1
        index1 = (index + 1) % 9
        if (index1 != 0)
        {
            val = get_bits (index1 + extend_x)
            sign = 0 - (val & 1)
            dmv_x = sign ^ ((val >> 1) + offset_table[index1])
            dmv_x = dmv_x - sign
        }
        else
            dmv_x = 0 if (extend_y == 1)
      offset_table = offset_table2
        else
      offset_table = offset_table1
        index1 = (index + 1) / 9
        if (index1 != 0)
        {
            val = get_bits (size_table[index1 + 2 * extend_y])
            sign = 0 - (val & 1)
            dmv_y = sign ^ ((val >> 1) + offset_table[index1 >> 1])
            dmv_y = dmv_y - sign
            predictor_flag = index1 & 1
        }
        else
        {
            dmv_y = 0
            predictor_flag = 0
        }
}
```

EXTENDED RANGE VARIABLE LENGTH CODING/DECODING OF DIFFERENTIAL MOTION VECTOR INFORMATION

RELATED APPLICATION INFORMATION

This application is a continuation-in-part of U.S. patent application Ser. No. 10/933,881, filed Sep. 2, 2004, which claims the benefit of U.S. Provisional Patent Application No. 60/501,081, filed Sep. 7, 2003, and which is a continuation-in-part of U.S. patent application Ser. No. 10/857,473, filed May 27, 2004, which also claims the benefit of U.S. Provisional Patent Application No. 60/501,081, filed Sep. 7, 2003, the disclosures of which are hereby incorporated by reference.

COPYRIGHT AUTHORIZATION

A portion of the disclosure of this patent document contains material which is subject to copyright protection. The copyright owner has no objection to the facsimile reproduction by anyone of the patent disclosure, as it appears in the Patent and Trademark Office patent file or records, but otherwise reserves all copyright rights whatsoever.

TECHNICAL FIELD

Techniques and tools for variable length coding and decoding of differential motion vector information are described. For example, a video decoder uses extended range variable length decoding when decoding differential motion vectors.

BACKGROUND

Digital video consumes large amounts of storage and transmission capacity. A typical raw digital video sequence includes 15 or 30 frames per second. Each frame can include tens or hundreds of thousands of pixels (also called pels), where each pixel represents a tiny element of the picture. In raw form, a computer commonly represents a pixel as a set of three samples totaling 24 bits. For instance, a pixel may include an eight-bit luminance sample (also called a luma sample, as the terms "luminance" and "luma" are used interchangeably herein) that defines the grayscale component of the pixel and two eight-bit chrominance samples (also called chroma samples, as the terms "chrominance" and "chroma" are used interchangeably herein) that define the color component of the pixel. Thus, the number of bits per second, or bit rate, of a typical raw digital video sequence may be 5 million bits per second or more.

Many computers and computer networks lack the resources to process raw digital video. For this reason, engineers use compression (also called coding or encoding) to reduce the bit rate of digital video. Compression decreases the cost of storing and transmitting video by converting the video into a lower bit rate form. Decompression (also called decoding) reconstructs a version of the original video from the compressed form. A "codec" is an encoder/decoder system. Compression can be lossless, in which the quality of the video does not suffer, but decreases in bit rate are limited by the inherent amount of variability (sometimes called entropy) of the video data. Or, compression can be lossy, in which the quality of the video suffers, but achievable decreases in bit rate are more dramatic. Lossy compression is often used in conjunction with lossless compression—the lossy compression establishes an approximation of information, and the lossless compression is applied to represent the approximation.

In general, video compression techniques include "intra-picture" compression and "inter-picture" compression, where a picture is, for example, a progressively scanned video frame, an interlaced video frame (having alternating lines for video fields), or an interlaced video field. For progressive frames, intra-picture compression techniques compress individual frames (typically called I-frames or key frames), and inter-picture compression techniques compress frames (typically called predicted frames, P-frames, or B-frames) with reference to a preceding and/or following frame (typically called a reference or anchor frame) or frames (for B-frames).

Inter-picture compression techniques often use motion estimation and motion compensation. For motion estimation, for example, an encoder divides a current predicted frame into 8×8 or 16×16 pixel units. For a unit of the current frame, a similar unit in a reference frame is found for use as a predictor. A motion vector ["MV"] indicates the location of the predictor in the reference frame. In other words, the MV for a unit of the current frame indicates the displacement between the spatial location of the unit in the current frame and the spatial location of the predictor in the reference frame. The encoder computes the sample-by-sample difference between the current unit and the predictor to determine a residual (also called error signal). If the current unit size is 16×16, the residual is divided into four 8×8 blocks. To each 8×8 residual, the encoder applies a reversible frequency transform operation, which generates a set of frequency domain (i.e., spectral) coefficients. A discrete cosine transform ["DCT"] is a type of frequency transform. The resulting blocks of spectral coefficients are quantized and entropy encoded.

If the predicted frame is used as a reference for subsequent motion compensation, the encoder reconstructs the predicted frame. When reconstructing residuals, the encoder reconstructs transforms coefficients (e.g., DCT coefficients) that were quantized and performs an inverse frequency transform such as an inverse DCT ["IDCT"]. The encoder performs motion compensation to compute the predictors, and combines the predictors with the residuals.

During decoding, a decoder typically entropy decodes information and performs analogous operations to reconstruct residuals, perform motion compensation, and combine the predictors with the residuals.

Since a MV value is often correlated with the values of spatially surrounding MVs, compression of the data used to transmit the MV information can be achieved by determining or selecting a MV predictor from neighboring macroblocks and predicting the MV for the current macroblock using the MV predictor. The encoder can encode the differential ["DMV"] between the MV and the MV predictor. For example, the encoder computes the difference between the horizontal component of the MV and the horizontal component of the MV predictor, computes the difference between the vertical component of the MV and the vertical component of the MV predictor, and encodes the differences. After reconstructing the MV by adding the DMV to the MV predictor, a decoder uses the MV to compute a prediction macroblock for the macroblock using information from the reference frame, which is a previously reconstructed frame available at the encoder and the decoder.

I. Inter Compression in Windows Media Video, Version 9

Microsoft Corporation's Windows Media Video, Version 9 ["WMV9"] includes a video encoder and a video decoder. The encoder uses intra and inter compression, and the decoder uses intra and inter decompression. The encoder and decoder may process progressive or interlaced video content.

Various configurations are allowed for MVs and macroblocks, including one MV per macroblock (1 MV macroblock), up to four luma block MVs per macroblock (4 MV macroblock) for a progressive P-frame, and one MV per top or bottom field of a field-coded macroblock in an interlaced P-frame. The rules for computing MV predictors vary for different types of content, macroblocks, and locations in a frame. However the MV predictors are computed, the various kinds of MVs are encoded as DMVs relative to the MV predictors.

The encoder and decoder use extended range MVs in some cases. The capability to use extended range MVs is signaled at sequence layer for a video sequence. If extended range MVs are allowed in a progressive P-frame, for example, the range for MVs is signaled at picture layer for the progressive P-frame. A default MV range is used when an extended MV range is not used.

A single MVDATA element is associated with all blocks in a 1 MV macroblock. MVDATA signals whether the blocks are coded as intra or inter type. If they are coded as inter, then MVDATA also indicates the DMV. Individual blocks within a 4 MV macroblock can be coded as intra blocks. For each of the four luminance blocks of a 4 MV macroblock, the intra/inter state is signaled by a BLKMVDATA element associated with that block. For a 4 MV macroblock, a CBPCY element indicates which blocks have BLKMVDATA elements present in the bitstream.

More specifically, a MVDATA or BLKMVDATA element jointly encodes three things: (1) the horizontal DMV component; (2) the vertical DMV component; and (3) a binary "last" flag that generally indicates whether transform coefficients are present. Whether the macroblock (or block, for 4 MV) is intra or inter-coded is signaled as one of the DMV possibilities. The pseudocode in FIG. 1A illustrates how DMV information, inter/intra type, and last flag information are decoded for MVDATA or BLKMVDATA. In the pseudocode, the variable intra_flag is a binary flag indicating whether the block or macroblock is intra. The variables dmv_x and dmv_y are horizontal and vertical DMV components, respectively. The variables k_x and k_y are fixed lengths for extended range MVs, whose values vary as shown in the table in FIG. 1B. The variable halfpel_flag is a binary value indicating whether half-pixel of quarter-pixel precision is used for the MV, and whose value is set based on picture layer syntax elements. Finally, the tables size_table and offset_table are arrays defined as follows:

size_table[6]={0, 2, 3, 4, 5, 8}, and
offset_table[6]={0, 1, 3, 7, 15, 31}.

In a field-coded macroblock of an interlaced P-field, a TOPMVDATA element is associated with the top field blocks, and a BOTMVDATA element is associated with the bottom field blocks. TOPMVDATA indicates whether the top field blocks are intra or inter. If they are inter, then TOPMVDATA also indicates the DMV for the top field blocks. Likewise, BOTMVDATA signals the inter/intra state for the bottom field blocks, and potential DMV information for the bottom field blocks. CBPCY indicates which fields have MV data elements present in the bitstream. For frame-coded macroblocks (1 MV) or field-coded macroblocks of interlaced P-frames, MVDATA, TOPMVDATA, and BOTMVDATA elements are decoded the same way as MVDATA and BLKMVDATA for MVs for progressive P-frames.

While the WMV9 encoder and WMV9 decoder are efficient for many different encoding/decoding scenarios and types of content, there is room for improvement in several places. In particular, coding of DMV information is inefficient in certain high-motion scenes with complex motion. For such scenes, MV prediction is not particularly effective, and a large number of DMVs are signaled with escape coding (i.e., the escape code and fixed length codes ["FLCs"]).

VI. Standards for Video Compression and Decompression

Several international standards relate to video compression and decompression. These standards include the Motion Picture Experts Group ["MPEG"] 1, 2, and 4 standards and the H.261, H.262 (another name for MPEG 2), H.263, and H.264 standards from the International Telecommunication Union ["ITU"]. An encoder and decoder complying with one of these standards typically use motion estimation and compensation to reduce the temporal redundancy between pictures.

Each of H.261, H.262, H.263, MPEG-1, MPEG-4, and H.264 specifies some form of DMV coding and decoding, although the details of the coding and decoding vary widely between the standards. DMV coding and decoding is simplest in the H.261 standard, for example, in which one variable length code ["VLC"] represents the horizontal differential component, and another VLC represents the vertical differential component. [H.261 standard, section 4.2.3.4.] Other standards specify more complex coding and decoding for DMV information. For additional detail, see the respective standards.

Given the critical importance of video compression and decompression to digital video, it is not surprising that video compression and decompression are richly developed fields. Whatever the benefits of previous video compression and decompression techniques, however, they do not have the advantages of the following techniques and tools.

SUMMARY

In summary, the detailed description is directed to various techniques and tools for extended range variable length coding and decoding of differential motion vector information. The described techniques and tools include, but are not limited to, the following:

A tool such as a video decoder determines whether or not to use an extended range variable length decoding mode. When the extended range variable length decoding mode is used, the tool decodes a differential motion vector in the extended range variable length decoding mode. Otherwise, the tool decodes the differential motion vector in a default range variable length decoding mode.

Or, a tool such as a video decoder parses a syntax element that indicates whether or not extended range variable length decoding of differential motion vectors is possible for plural video pictures. If so, the tool performs additional processing that allows use of extended range variable length decoding of differential motion vectors for the plural video pictures. Otherwise, the tool skips the additional processing.

Or, a tool such as a video encoder signals a syntax element that indicates whether or not extended range variable length decoding of differential motion vectors is possible for plural video pictures. If the syntax element indicates that extended range variable length decoding of differential motion vectors is possible, the tool performs additional processing that allows use of extended range variable length decoding of differential motion vectors for the plural video pictures. Otherwise, the tool skips the additional processing.

The various techniques and tools can be used in combination or independently.

Additional features and advantages will be made apparent from the following detailed description of different embodiments that proceeds with reference to the accompanying drawings.

BRIEF DESCRIPTION OF THE DRAWINGS

FIGS. 1A and 1B are pseudocode and a table illustrating decoding of DMV information according to the prior art.

FIG. 4 is a block diagram of a generalized video decoder system in conjunction with which several described embodiments may be implemented.

FIG. 5 is pseudocode for default range variable length coding of DMVs.

FIGS. 6A-6C are pseudocode and a table for default range variable length decoding of DMVs.

FIG. 7 is pseudocode for extended range variable length coding of DMVs.

FIGS. 11A-11C are tables for codes in the combined implementation.

FIGS. 12A-12C are pseudocode and a table for extended range variable length decoding of DMVs in the combined implementation.

DETAILED DESCRIPTION

The present application relates to techniques and tools for efficient compression and decompression. In various described embodiments, a video encoder and decoder incorporate techniques for encoding and decoding DMV information, along with corresponding signaling techniques for use with a bitstream format or syntax comprising different layers or levels (e.g., sequence level, frame level, field level, slice level, macroblock level, and/or block level). Efficient techniques and tools for compressing and decompressing DMVs are important parts of a video codec.

Various alternatives to the implementations described herein are possible. For example, techniques described with reference to flowchart diagrams can be altered by changing the ordering of stages shown in the flowcharts, by repeating or omitting certain stages, etc. As another example, although some implementations are described with reference to specific macroblock formats, other formats also can be used. Further, techniques and tools described with reference to a specific type of picture (e.g., interlaced forward-predicted field) may also be applicable to other types of pictures.

In various embodiments, an encoder and decoder use flags and/or signals in a bitstream. While specific flags and signals are described, it should be understood that this manner of description encompasses different conventions (e.g., 0s rather than 1s) for the flags and signals.

The various techniques and tools can be used in combination or independently. Different embodiments implement one or more of the described techniques and tools.

I. Computing Environment

Figure 2:
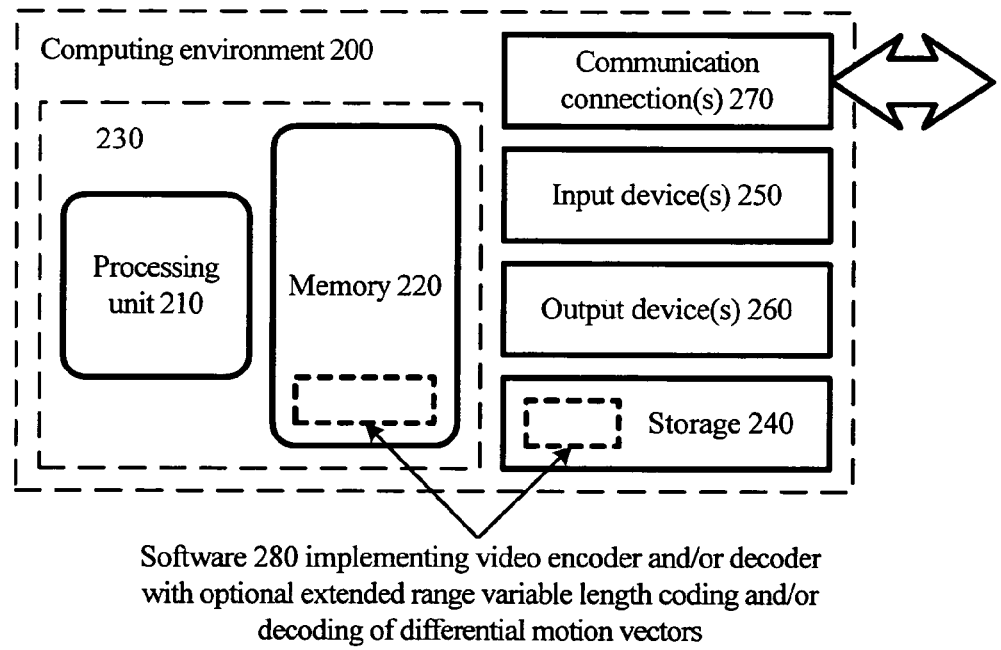
FIG. 2 is a block diagram of a suitable computing environment in conjunction with which several described embodiments may be implemented.

FIG. 2 illustrates a generalized example of a suitable computing environment (200) in which several of the described embodiments may be implemented. The computing environment (200) is not intended to suggest any limitation as to scope of use or functionality, as the techniques and tools may be implemented in diverse general-purpose or special-purpose computing environments.

With reference to FIG. 2, the computing environment (200) includes at least one processing unit (210) and memory (220). In FIG. 2, this most basic configuration (230) is included within a dashed line. The processing unit (210) executes computer-executable instructions and may be a real or a virtual processor. In a multi-processing system, multiple processing units execute computer-executable instructions to increase processing power. The memory (220) may be volatile memory (e.g., registers, cache, RAM), non-volatile memory (e.g., ROM, EEPROM, flash memory, etc.), or some combination of the two. The memory (220) stores software (280) implementing a video encoder or decoder with optional extended range variable length coding or decoding of DMVs.

A computing environment may have additional features. For example, the computing environment (200) includes storage (240), one or more input devices (250), one or more output devices (260), and one or more communication connections (270). An interconnection mechanism (not shown) such as a bus, controller, or network interconnects the components of the computing environment (200). Typically, operating system software (not shown) provides an operating environment for other software executing in the computing environment (200), and coordinates activities of the components of the computing environment (200).

The storage (240) may be removable or non-removable, and includes magnetic disks, magnetic tapes or cassettes, CD-ROMs, DVDs, or any other medium which can be used to store information and which can be accessed within the computing environment (200). The storage (240) stores instructions for the software (280) implementing the video encoder or decoder.

The input device(s) (250) may be a touch input device such as a keyboard, mouse, pen, or trackball, a voice input device, a scanning device, or another device that provides input to the computing environment (200). For audio or video encoding, the input device(s) (250) may be a sound card, video card, TV tuner card, or similar device that accepts audio or video input in analog or digital form, or a CD-ROM or CD-RW that reads audio or video samples into the computing environment (200). The output device(s) (260) may be a display, printer, speaker, CD-writer, or another device that provides output from the computing environment (200).

The communication connection(s) (270) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment (200), computer-readable media include memory (220), storage (240), communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. For the sake of presentation, the detailed description uses terms like "estimate," "compensate," "predict," and "apply" to describe computer operations in a computing environment. These terms are high-level abstractions for operations performed by a computer, and should not be confused with acts performed by a human being. The actual computer operations corresponding to these terms vary depending on implementation.

II. Generalized Video Encoder and Decoder

Figure 3:
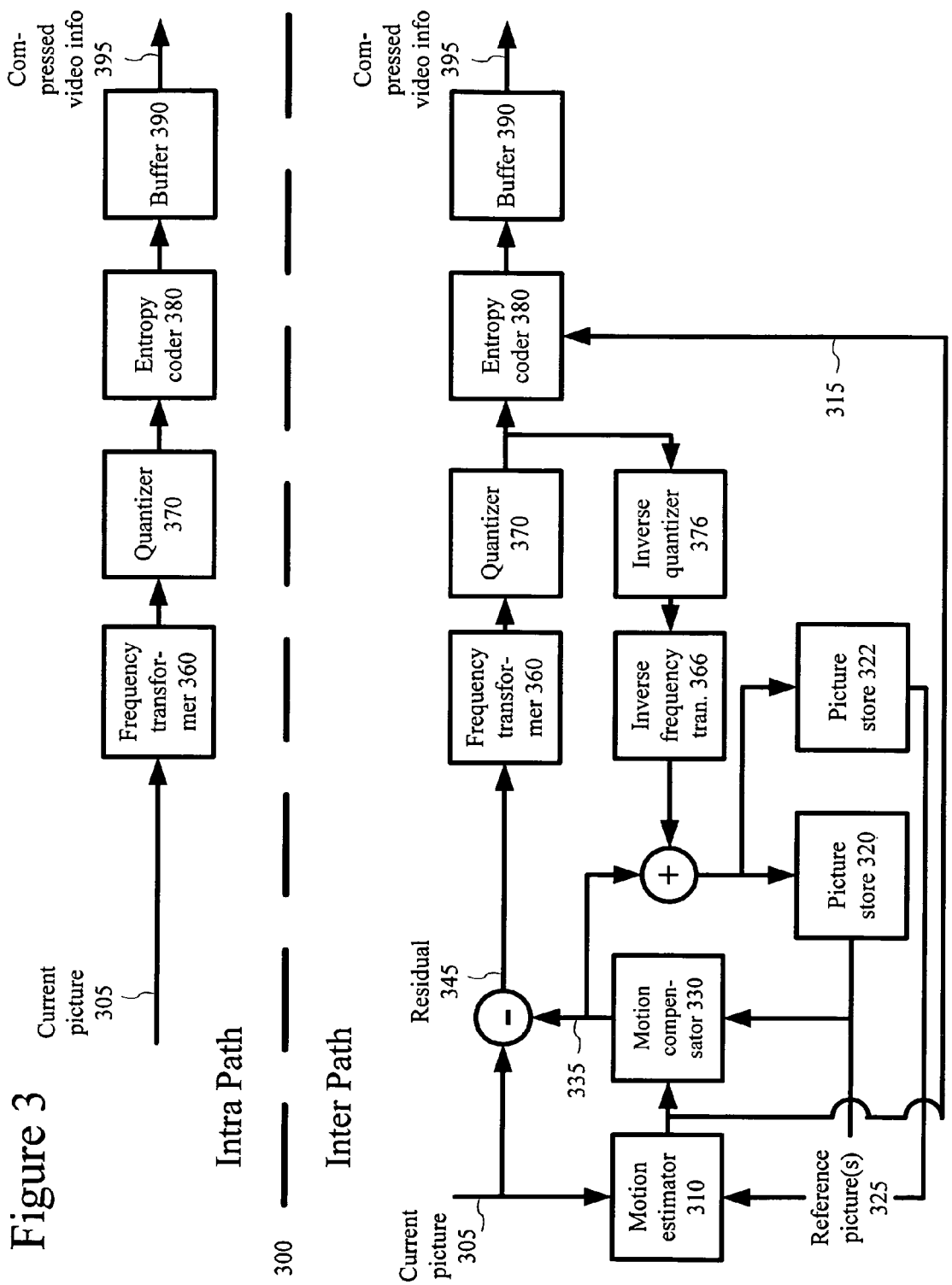
FIG. 3 is a block diagram of a generalized video encoder system in conjunction with which several described embodiments may be implemented.

FIG. 3 is a block diagram of a generalized video encoder system (300), and FIG. 4 is a block diagram of a generalized video decoder system (400), in conjunction with which various described embodiments may be implemented.

The relationships shown between modules within the encoder and decoder indicate the main flow of information in the encoder and decoder; other relationships are not shown for the sake of simplicity. In particular, FIGS. 3 and 4 usually do not show side information indicating the encoder settings, modes, tables, etc. used for a video sequence, frame, macroblock, block, etc. Such side information is sent in the output bitstream, typically after entropy encoding of the side information. The format of the output bitstream can be a WMV9 or other format.

The encoder (300) and decoder (400) process video pictures, which may be video frames, video fields or combinations of frames and fields. The bitstream syntax and semantics at the picture and macroblock levels may depend on whether frames or fields are used. There may be changes to macroblock organization and overall timing as well. The encoder (300) and decoder (400) are block-based and use a 4:2:0 macroblock format for frames, with each macroblock including four 8×8 luminance blocks (at times treated as one 16×16 macroblock) and two 8×8 chrominance blocks. For fields, the same or a different macroblock organization and format may be used. The 8×8 blocks may be further sub-divided at different stages, e.g., at the frequency transform and entropy encoding stages. Example video frame organizations are described in the next section.

Depending on implementation and the type of compression desired, modules of the encoder or decoder can be added, omitted, split into multiple modules, combined with other modules, and/or replaced with like modules. In alternative embodiments, encoders or decoders with different modules and/or other configurations of modules perform one or more of the described techniques.

A. Video Frame Organizations

In some implementations, the encoder (300) and decoder (400) process video frames organized as follows. A frame contains lines of spatial information of a video signal. For progressive video, these lines contain samples starting from one time instant and continuing through successive lines to the bottom of the frame. An interlaced video frame consists of two scans of a frame—one comprising the even lines of the frame (the top field) and the other comprising the odd lines of the frame (the bottom field). The two fields may represent two different time periods or they may be from the same time period.

A progressive video frame is divided into macroblocks, such as one that includes four 8×8 luminance blocks (Y1 through Y4) and two 8×8 chrominance blocks that are co-located with the four luminance blocks but half resolution horizontally and vertically, following the conventional 4:2:0 macroblock format. The 8×8 blocks may be further sub-divided at different stages, e.g., at the frequency transform (e.g., 8×4, 4×8 or 4×4 DCTs) and entropy encoding stages. A progressive I-frame is an intra-coded progressive video frame. A progressive P-frame is a progressive video frame coded using forward prediction, and a progressive B-frame is a progressive video frame coded using bi-directional prediction. Progressive P- and B-frames may include intra-coded macroblocks as well as different types of predicted macroblocks.

An interlaced video frame may be organized for encoding/decoding as a frame, in which case the interlaced video frame is partitioned into field-coded and/or frame-coded macroblocks. An interlaced I-frame is two intra-coded fields of an interlaced video frame, where a macroblock includes information for the two fields. An interlaced P-frame is two fields of an interlaced video frame coded using forward prediction, and an interlaced B-frame is two fields of an interlaced video frame coded using bi-directional prediction, where a macroblock includes information for the two fields. Interlaced P and B-frames may include intra-coded macroblocks as well as different types of predicted macroblocks.

Or, an interlaced video frame may be organized for separate encoding/decoding as fields. Each of the two fields of the interlaced video frame is partitioned into macroblocks. The top field is partitioned into macroblocks, and the bottom field is partitioned into macroblocks. An interlaced I-field is a single, separately represented field of an interlaced video frame. An interlaced P-field is a single, separately represented field of an interlaced video frame coded using forward prediction, and an interlaced B-field is a single, separately represented field of an interlaced video frame coded using bi-directional prediction. Interlaced P- and B-fields may include intra-coded macroblocks as well as different types of predicted macroblocks.

The term picture generally refers to source, coded or reconstructed image data. For progressive video, a picture is a progressive video frame. For interlaced video, a picture may refer to an interlaced video frame, the top field of the frame, or the bottom field of the frame, depending on the context.

Alternatively, the encoder (300) and decoder (400) are object-based, use a different macroblock or block format, or perform operations on sets of pixels of different size or configuration than 8×8 blocks and 16×16 macroblocks.

B. Video Encoder

FIG. 3 is a block diagram of a generalized video encoder system (300). The encoder system (300) receives a sequence of video pictures including a current picture (305) (e.g., progressive video frame, interlaced video frame, or field of an interlaced video frame), and produces compressed video information (395) as output. Particular embodiments of video encoders typically use a variation or supplemented version of the generalized encoder (300).

The encoder system (300) compresses predicted pictures and key pictures. For the sake of presentation, FIG. 3 shows a path for key pictures through the encoder system (300) and a path for forward-predicted pictures. Many of the components of the encoder system (300) are used for compressing both key pictures and predicted pictures. The exact operations performed by those components can vary depending on the type of information being compressed.

A predicted picture (also called P-picture, B-picture for bi-directional prediction, or inter-coded picture) is represented in terms of prediction (or difference) from one or more other pictures. A prediction residual is the difference between what was predicted and the original picture. In contrast, a key picture (also called an I-picture or intra-coded picture) is compressed without reference to other pictures.

If the current picture (305) is a forward-predicted picture, a motion estimator (310) estimates motion of macroblocks or other sets of pixels of the current picture (305) with respect to a reference picture, which is a reconstructed previous picture (325) buffered in the picture store (320). In alternative embodiments, the reference picture is a later picture or the current picture is bi-directionally predicted. The motion estimator (310) can estimate motion by pixel, ½ pixel, ¼ pixel, or other increments, and can switch the precision of the motion estimation on a picture-by-picture basis or other basis. The precision of the motion estimation can be the same or different horizontally and vertically. The motion estimator (310) outputs as side information motion information (315) such as MVs. A motion compensator (330) applies the motion information (315) to the reconstructed previous picture (325) to form a motion-compensated current picture (335). The prediction is rarely perfect, however, and the difference between the motion-compensated current picture (335) and the original current picture (305) is the prediction residual (345). Alternatively, a motion estimator and motion compensator apply another type of motion estimation/compensation.

A frequency transformer (360) converts the spatial domain video information into frequency domain (i.e., spectral) data. For block-based video pictures, the frequency transformer (360) applies a DCT or variant of DCT to blocks of the pixel data or prediction residual data, producing blocks of DCT coefficients. Alternatively, the frequency transformer (360) applies another conventional frequency transform such as a Fourier transform or uses wavelet or subband analysis. The frequency transformer (360) applies an 8×8, 8×4, 4×8, 4×4 or other size frequency transforms (e.g., DCT) to prediction residuals for predicted pictures.

A quantizer (370) then quantizes the blocks of spectral data coefficients. The quantizer applies uniform, scalar quantization to the spectral data with a step-size that varies on a picture-by-picture basis or other basis. Alternatively, the quantizer applies another type of quantization to the spectral data coefficients, for example, a non-uniform, vector, or non-adaptive quantization, or directly quantizes spatial domain data in an encoder system that does not use frequency transformations. In addition to adaptive quantization, the encoder (300) can use frame dropping, adaptive filtering, or other techniques for rate control.

If a given macroblock in a predicted picture has no information of certain types (e.g., no motion information for the macroblock and no residual information), the encoder (300) may encode the macroblock as a skipped macroblock. If so, the encoder signals the skipped macroblock in the output bitstream of compressed video information (395).

When a reconstructed current picture is needed for subsequent motion estimation/compensation, an inverse quantizer (376) performs inverse quantization on the quantized spectral data coefficients. An inverse frequency transformer (366) then performs the inverse of the operations of the frequency transformer (360), producing a reconstructed prediction residual (for a predicted picture) or reconstructed samples (for an intra-coded picture). If the picture (305) being encoded is an intra-coded picture, then the reconstructed samples form the reconstructed current picture (not shown). If the picture (305) being encoded is a predicted picture, the reconstructed prediction residual is added to the motion-compensated predictions (335) to form the reconstructed current picture. The picture store (320) buffers the reconstructed current picture for use in predicting a next picture. In some embodiments, the encoder applies a deblocking filter to the reconstructed frame to adaptively smooth discontinuities between the blocks of the frame.

The entropy coder (380) compresses the output of the quantizer (370) as well as certain side information (e.g., motion information (315), quantization step size). Typical entropy coding techniques include arithmetic coding, differential coding, Huffman coding, run length coding, LZ coding, dictionary coding, and combinations of the above. The entropy coder (380) typically uses different coding techniques for different kinds of information (e.g., DC coefficients, AC coefficients, different kinds of side information), and can choose from among multiple code tables within a particular coding technique.

The entropy coder (380) puts compressed video information (395) in the buffer (390). A buffer level indicator is fed back to bit rate adaptive modules. The compressed video information (395) is depleted from the buffer (390) at a constant or relatively constant bit rate and stored for subsequent streaming at that bit rate. Therefore, the level of the buffer (390) is primarily a function of the entropy of the filtered, quantized video information, which affects the efficiency of the entropy coding. Alternatively, the encoder system (300) streams compressed video information immediately following compression, and the level of the buffer (390) also depends on the rate at which information is depleted from the buffer (390) for transmission.

Before or after the buffer (390), the compressed video information (395) can be channel coded for transmission over the network. The channel coding can apply error detection and correction data to the compressed video information (395).

C. Video Decoder

FIG. 4 is a block diagram of a generalized video decoder system (400). The decoder system (400) receives information (495) for a compressed sequence of video pictures and produces output including a reconstructed picture (405) (e.g., progressive video frame, interlaced video frame, or field of an interlaced video frame). Particular embodiments of video decoders typically use a variation or supplemented version of the generalized decoder (400).

The decoder system (400) decompresses predicted pictures and key pictures. For the sake of presentation, FIG. 4 shows a path for key pictures through the decoder system (400) and a path for forward-predicted pictures. Many of the components of the decoder system (400) are used for decompressing both key pictures and predicted pictures. The exact operations performed by those components can vary depending on the type of information being decompressed.

A buffer (490) receives the information (495) for the compressed video sequence and makes the received information available to the entropy decoder (480). The buffer (490) typically receives the information at a rate that is fairly constant over time, and includes a jitter buffer to smooth short-term variations in bandwidth or transmission. The buffer (490) can include a playback buffer and other buffers as well. Alternatively, the buffer (490) receives information at a varying rate. Before or after the buffer (490), the compressed video information can be channel decoded and processed for error detection and correction.

The entropy decoder (480) entropy decodes entropy-coded quantized data as well as entropy-coded side information (e.g., motion information (415), quantization step size), typically applying the inverse of the entropy encoding performed in the encoder. Entropy decoding techniques include arithmetic decoding, differential decoding, Huffman decoding, run length decoding, LZ decoding, dictionary decoding, and combinations of the above. The entropy decoder (480) frequently uses different decoding techniques for different kinds of information (e.g., DC coefficients, AC coefficients, different kinds of side information), and can choose from among multiple code tables within a particular decoding technique.

If the picture (405) to be reconstructed is a forward-predicted picture, a motion compensator (430) applies motion information (415) to a reference picture (425) to form a prediction (435) of the picture (405) being reconstructed. For example, the motion compensator (430) uses a macroblock MV to find a macroblock in the reference picture (425). A picture buffer (420) stores previous reconstructed pictures for use as reference pictures. The motion compensator (430) can compensate for motion at pixel, ½ pixel, ¼ pixel, or other increments, and can switch the precision of the motion compensation on a picture-by-picture basis or other basis. The precision of the motion compensation can be the same or different horizontally and vertically. Alternatively, a motion compensator applies another type of motion compensation. The prediction by the motion compensator is rarely perfect, so the decoder (400) also reconstructs prediction residuals.

An inverse quantizer (470) inverse quantizes entropy-decoded data. In general, the inverse quantizer applies uniform, scalar inverse quantization to the entropy-decoded data with a step-size that varies on a picture-by-picture basis or other basis. Alternatively, the inverse quantizer applies another type of inverse quantization to the data, for example, a non-uniform, vector, or non-adaptive inverse quantization, or directly inverse quantizes spatial domain data in a decoder system that does not use inverse frequency transformations.

An inverse frequency transformer (460) converts the quantized, frequency domain data into spatial domain video information. For block-based video pictures, the inverse frequency transformer (460) applies an IDCT or variant of IDCT to blocks of the DCT coefficients, producing pixel data or prediction residual data for key pictures or predicted pictures, respectively. Alternatively, the frequency transformer (460) applies another conventional inverse frequency transform such as an inverse Fourier transform or uses wavelet or sub-band synthesis. The inverse frequency transformer (460) applies an 8×8 8×4, 4×8, 4×4, or other size inverse frequency transforms (e.g., IDCT) to prediction residuals for predicted pictures.

When the decoder needs a reconstructed picture for subsequent motion compensation, the picture store (420) buffers the reconstructed picture for use in predicting a next picture. In some embodiments, the encoder applies a deblocking filter to the reconstructed frame to adaptively smooth discontinuities between the blocks of the frame.

III. Extended Range Variable Length Coding/Decoding of DMV Information

In some embodiments, an encoder and decoder use extended range variable length coding and decoding, respectively, of DMV information. Compared to a default range variable length coding, the extended range coding more efficiently represents DMVs having values just outside the default range but within the extended range, and it is more efficient overall in scenarios where such DMV values are common.

A DMV is computed, for example, as the component-wise difference between a MV predictor and actual MV as follows:

$$DMVX=MVX-PMVX, \text{ and}$$

$$DMVY=MVY-PMVY,$$

where DMVX, MVX, and PMVX are the horizontal components of the DMV, actual MV, and MV predictor, respectively, and DMVY, MVY, and PMVY are the vertical components of the DMV, actual MV, and MV predictor, respectively. The MV predictors are derived using any of various kinds of MV prediction. U.S. patent application Ser. Nos. 10/857,473, filed May 27, 2004, Ser. No. 10/933,882, filed Sep. 2, 2004, and Ser. No. 10/882,135, filed Jun. 29, 2004, the disclosures of which are incorporated by reference, describe MV prediction for different types of pictures.

A. Default Range Variable Length Coding/Decoding of DMVs

This section illustrates examples of default range variable length coding and decoding of DMV information.

The pseudocode in FIG. 5 shows default range variable length coding of DMV information according to a generalized signaling mechanism. The MV components are integers suitably scaled to represent motion of quarter or half-pixel precision, or any arbitrary precision. In the pseudocode, the variables DMVX and DMVY are horizontal and vertical DMV components, respectively. The variables AX and AY are the absolute values of the differential components, and the variables SX and SY are the signs of the differential components. The horizontal MV range is from $-RX$ to $RX-1$, and the vertical MV range is from $-RY$ to $RY-1$. RX and RY are powers of two, with exponents of MX and MY, respectively. Modular arithmetic is used in the computation of differential motion vectors, therefore the horizontal and vertical DMV range is identical to the respective MV range. The variables ESCX and ESCY (which are powers of two with exponents KX and KY, respectively) are fixed in the pseudocode of FIG. 5. They define the ends of the default range, indicating the thresholds above which escape coding is used.

When the escape condition is triggered (AX>ESCX or AY>ESCY), the encoder sends a VLC that represents the escape mode signal. The encoder then sends DMVX and DMVY as FLCs of lengths MX+1 and MY+1, respectively. Thus, one element (i.e., the escape code) in the VLC table is used to signal that DMVX and DMVY are coded using MX+MY+2 bits collectively.

For other events, the variables NX and NY indicate how many bits are used to signal different values of AX and AY, respectively. AX is in the interval $2^{NX}<=AX<2^{NX+1}$, where NX=0, 1, 2, . . . KX−1, and where AX=0 when NX=−1. AY is in the interval ($2^{NY}<=AY<2^{NY+1}$), where NY=0, 1, 2, . . . KY−1, and where AY=0 when NY=−1. For events signaled with NX and NY, the encoder sends a VLC indicating a combination of NX and NY values. The encoder then sends AX as NX bits, sends SX as one bit, sends AY as NY bits, and sends SY as one bit. If NX is 0 or −1, AX does not need to be sent, and the same is true for NY and AY, since the value of AX or AY may be directly derived from NX or NY in those cases.

Thus, the VLC table used to code the size information NX and NY is a table of (KX+1)*(KY+1) elements, where each element is a (codeword, codesize) pair. Of the elements in the table, all but one are used to jointly signal values of NX and NY. The other element is the escape code. The event where AX=0 and AY=0 is signaled by another mechanism such as a skip macroblock mechanism or MV block pattern. The [0,0] element is not present in the VLC table or addressed in the pseudocode.

A corresponding decoder performs decoding that mirrors the encoding shown in FIG. 5. For example, the decoder receives bits instead of sending bits, performs variable length decoding instead of variable length encoding, etc.

FIGS. 6A and 6C show pseudocode, and FIG. 6B shows a table, for other examples of default range variable length decoding of DMV information. In FIG. 6C, the DMV information is jointly coded with reference field selection information. Unlike the pseudocode shown in FIG. 5, in FIGS. 6A-6C the overall MV range can vary, with the variables k_x and k_y changing accordingly. The number of bits retrieved in escape coding modes depends on k_x and k_y. The range of values represented without escape codes is still the default range, however, as in the pseudocode in FIG. 5.

A corresponding encoder performs encoding that mirrors the decoding shown in 6A and 6C. For example, the encoder performs variable length encoding instead of variable length decoding, sends bits instead of receiving bits, etc.

B. Extended Range Variable Length Coding/Decoding of DMVs

Various examples of signaling mechanisms for extended range variable length coding and decoding of DMV information are provided. Alternatively, an encoder and decoder code and decode the information in conjunction with another mechanism.

1. Simple Extended Range Coding/Decoding

The pseudocode in FIG. 7 shows extended range variable length coding of DMV information according to a generalized signaling mechanism. The MV components are integers suitably scaled to represent motion of quarter or half-pixel precision, or any arbitrary precision. As in the pseudocode in FIG. 5, the variables DMVX and DMVY are horizontal and vertical DMV components, respectively. The variables AX and AY are the absolute values of the differential components, and the variables SX and SY are the signs of the differential components. The horizontal MV range is from −RX to RX−1, and the vertical MV range is from −RY to RY−1. RX and RY are powers of two, with exponents of MX and MY, respectively.

The variable EX indicates whether or not extended range variable length coding is used for a horizontal DMV component. EX=1 if extended range coding of the horizontal DMV component is used. Otherwise, EX=0. Likewise, the variable EY indicates whether or not extended range variable length coding is used for a vertical DMV component. EY=1 if extended range coding of the vertical DMV component is used. Otherwise, EY=0. The variables ESCX and ESCY (which are powers of two with exponents KX+EX and KY+EY, respectively) are the ends of the optionally extended ranges for non-escape coding of horizontal and vertical components, indicating the thresholds above which escape coding is used.

When the escape condition is triggered (AX>ESCX or AY>ESCY), the encoder sends a VLC that represents the escape mode signal. The encoder then sends DMVX and DMVY as FLCs of lengths MX+1 and MY+1, respectively. Thus, one element (i.e., the escape code) in the VLC table is used to signal that DMVX and DMVY are coded using (MX+MY+2) bits collectively.

For other events, the variables NX and NY satisfy the following conditions, which address different cases for EX and EY.

(1) When EX=0, AX is in the interval $2^{NX}<=AX<2^{NX+1}$, where NX=0, 1, 2, . . . KX−1. AX=0 when NX=−1.
(2) When EY=0, AY is in the interval $2^{NY}<=AY<2^{NY+1}$, where NY=0, 1, 2, . . . KY−1. AY=0 when NY=−1.
(3) When EX=1, AX is in the interval $2^{NX+1}-1<=AX<2^{NX+2}-1$, where NX=0, 1, 2, . . . KX−1. AX=0 when NX=−1.
(4) When EY=1, AY is in the interval $2^{NY+1}-1<=AY<2^{NY+2}-1$, where NY=0, 1, 2, . . . KY−1. AY=0 when NY=−1.

For events signaled with NX and NY, the encoder sends a VLC indicating a combination of NX and NY values. The encoder then sends AX as NX+EX bits, sends SX as one bit, sends AY as NY+EY bits, and sends SY as one bit. If NX is 0 or −1, AX does not need to be sent, and the same is true for NY and AY, since the value of AX or AY may be directly derived from NX or NY in those cases.

Thus, the VLC table used to code the size information NX and NY is a table of (KX+1)*(KY+1) elements, where each element is a (codeword, codesize) pair. Of the elements in the table, all but one are used to jointly signal values of NX and NY. The other element is the escape code. The event where AX=0 and AY=0 is signaled by another mechanism such as a skip macroblock mechanism or MV block pattern. The [0,0] element is not present in the VLC table or addressed in the pseudocode.

A corresponding decoder performs decoding that mirrors the encoding shown in FIG. 7. For example, the decoder receives bits instead of sending bits, performs variable length decoding instead of variable length encoding, etc.

2. Extended Range Coding/Decoding with Variable MV Range

FIGS. 12A and 12C show pseudocode, and FIG. 12B shows a table, for extended range variable length decoding of DMV information in a combined implementation. In FIG. 12C, the DMV information is jointly coded with reference field selection information. Unlike the pseudocode shown in FIG. 7, in FIGS. 12A-12C the overall MV range can vary, with the variables k_x and k_y changing accordingly. The number of bits retrieved in escape coding modes depends on k_x and k_y. The ranges of values represented with non-escape VLCs are the optionally extended ranges KX+EX and KY+EY, however, as in FIG. 7. The pseudocode in FIGS. 12A and 12C is explained in detail in section IV.

A corresponding encoder performs encoding that mirrors the decoding shown in 12A and 12C. For example, the encoder performs variable length encoding instead of variable length decoding, sends bits instead of receiving bits, etc.

3. Advantages of Extended Range Coding/Decoding

The default range variable length coding and decoding described above allow a default range of horizontal and vertical differential components to be coded with non-escape VLCs. For example, the default range in the pseudocode of FIG. 5 is −ESCX to +ESCX for the horizontal components and −ESCY to +ESCY for the vertical components. This provides efficient compression in many scenarios. If a particular distribution of DMVs has a significant number of events outside this default range, however, then the DMV information is not efficiently coded (the less efficient escape coding mechanism is used). Extended range variable length coding and decoding address this situation by extending the coding and decoding schemes to allow a greater range for variable length coding and decoding of the DMV information.

In the examples of extended range variable length coding/decoding shown above, the range of DMV values that can be coded using the VLC table (i.e., not escape coded) is roughly double the default range. This allows more efficient coding when a large number of DMVs are just outside the default range. One downside for the extended range coding/decoding, however, is that a DMV component with certain absolute values (e.g., 1, 3, 7, 15) takes an extra bit to encode, compared to the default range coding/decoding.

In the examples above, the same VLC table is used for the normal range and the extended range variable length coding/ decoding. This simplifies implementation and reduces storage and memory costs. Alternatively, the default range coding/decoding and extended range coding/decoding use different VLC tables.

In the examples above, the extended range coding/decoding uses one extra bit horizontally and one extra bit vertically, effectively doubling the non-escape VLC range. Alternatively, the range of variable length coding/decoding is further extended by another factor of 2, for example, by setting EX=m and EY=n, where m and n are integers greater than 1. In the same or other alternative implementations, the range of DMV may be extended by signaling/retrieving extra bits in the escape coding mode.

C. Signaling Use of Extended Range Coding/Decoding

In some embodiments, the encoder and decoder use a signaling mechanism to enable/disable the use of the extended range variable length coding and decoding at an entry point for a video sequence. If the extended range coding/decoding is enabled at an entry point, a per-picture signal indicates whether and how the extended range coding/decoding is used for the picture. Alternatively, the signaling mechanism enables/disables the use of the extended range coding/decoding at some other bitstream layer (e.g., sequence layer). Or, the signaling mechanism indicates on some other basis (e.g., per entry point, per slice) whether and how the extended range variable length coding/decoding is used.

At a high level, signaled information for extended range variable length coding and decoding includes extended range on/off information. The on/off information may include: (a) whether or not extended range coding/decoding of DMVs is allowed or not allowed overall (e.g., for an entire sequence or part of a sequence); and (b) if extended range coding/decoding is possible, whether and how extended range coding/decoding is used for DMVs of a particular picture.

1. Overall On/Off Signaling

At an entry point, one bit indicates whether or not use of extended range coding/decoding of DMVs is enabled for the pictures starting at that entry point and continuing up to the next entry point. If extended range coding/decoding is allowed, later elements indicate when and how it is used. Alternatively, the extended range coding/decoding is enabled/disabled at some other syntax level (e.g., sequence level). Or, extended range coding/decoding is always allowed and the overall on/off signaling is skipped.

2. Picture-level On/Off Signaling

If extended range coding/decoding is allowed, one or more additional signals indicate when to use the extended range coding/decoding for a picture.

Horizontal and vertical range extension indicators (e.g., corresponding to EX and EY) are signaled at picture layer for a current predicted picture. The horizontal and vertical indicators are independent. Thus, for example, the horizontal VLC range can be extended while the vertical VLC range is the default range, or vice versa, or both horizontal and vertical VLC ranges may be extended. The various combinations of horizontal and vertical indicators may be represented with a joint VLC, for example, as shown in FIG. 11C. Alternatively, the horizontal and vertical VLC range indicators are separately signaled, jointly signaled with a FLC, or signaled with some other mechanism.

Instead of signaling at picture layer, alternatively, horizontal and vertical VLC range extension indicators (e.g., corresponding to EX and EY) are signaled at some other layer (e.g., slice layer) using codes as shown in FIG. 11C or through some other signaling mechanism. Or, a single VLC range indicator is signaled at picture layer, slice layer, or some other layer indicating whether to use extended range coding/decoding both horizontally and vertically.

3. Decoding Technique for Signaled Information

A decoder such as the decoder (400) of FIG. 4 decodes extended VLC range on/off information. For example, the decoder performs the technique (800) shown in FIG. 8 to decode such on/off information.

The decoder decodes (810) one or more signals that indicate whether extended range variable length decoding capability is on or off for a segment of pictures. For example, the decoder decodes a sequence-layer syntax element or entry-point layer syntax element that indicates whether extended range variable length decoding of DMV information is allowed.

If extended range variable length decoding of DMV information is not allowed (the "no" path out of decision 812), the decoder uses (820) only default range variable length decoding of DMV information for the segment (e.g., the video sequence, the pictures following an entry point). Otherwise (the "yes" path out of decision 812), the decoder decodes (830) one or more signals that indicate whether extended range variable length decoding is on or off for a particular picture. For example, the decoder decodes a VLC that jointly indicates for horizontal and vertical DMV components whether or not extended range variable length decoding is used.

If extended range variable length decoding is used for a particular picture (the "yes" path out of decision 832), the decoder uses (840) extended range variable length decoding of DMV information for the picture. Otherwise (the "no" path out of decision 832), the decoder uses (850) default range variable length decoding of DMV information for the picture.

After decoding of the DMV information for the picture, if there is another picture in the segment (the "yes" path out of decision 860), the decoder decodes (830) one or more signals that indicate whether extended range variable length decoding is on or off for the next picture.

After decoding the DMV information for the pictures in the segment, if there is another segment (e.g., another entry point) (the "yes" path out of decision 870), the decoder decodes (810) one or more signals that indicate whether extended range variable length decoding capability is on or off for the next segment. Otherwise (the "no" path out of decision 870), the technique (800) ends.

Figure 8:
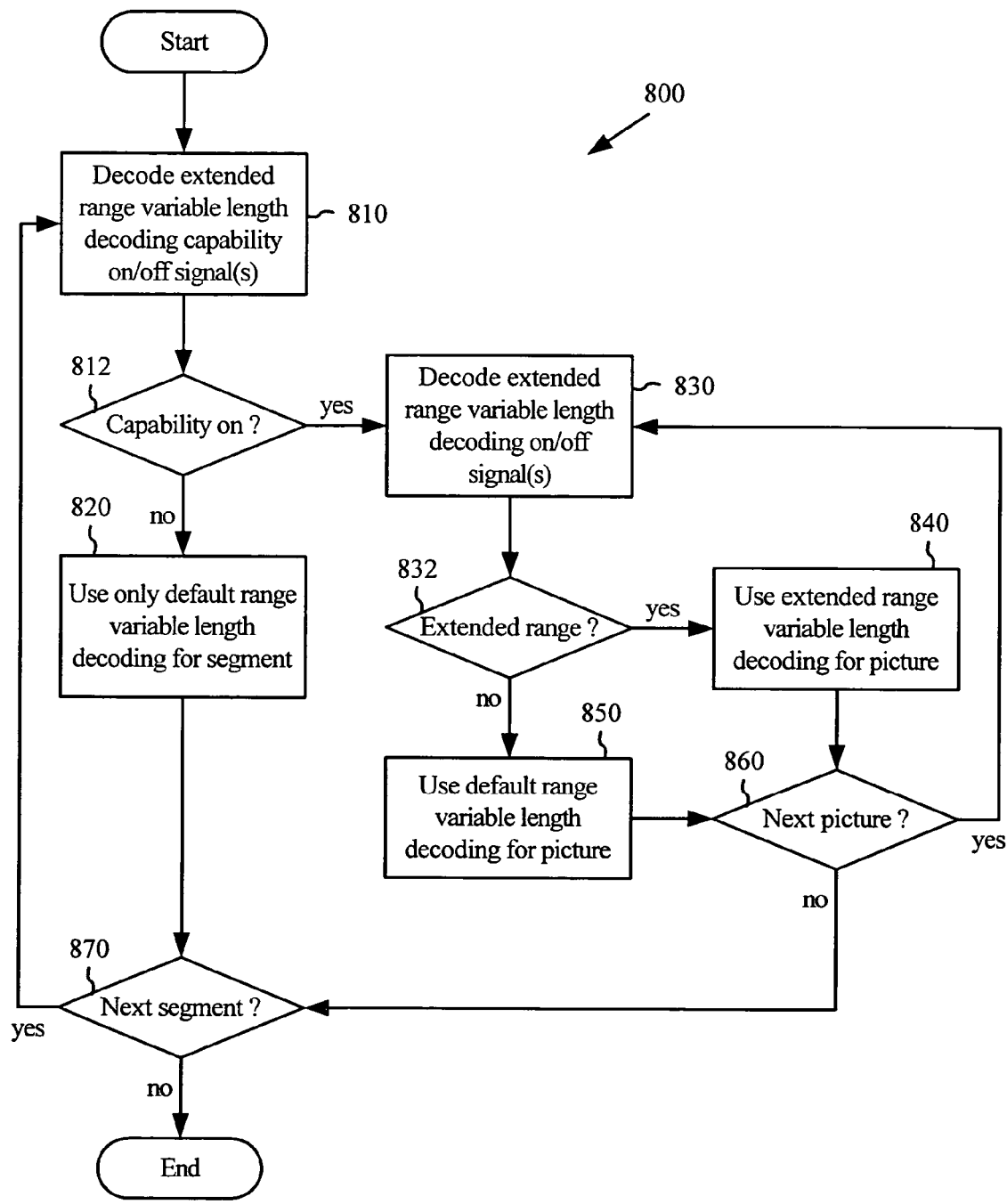
FIG. 8 is a flowchart showing a technique for signaling use of extended VLC range for DMVs.

For the sake of simplicity, FIG. 8 does not show the various ways in which the technique (800) may be integrated with other aspects of decoding (e.g., with other signaling, with actual decoding of DMV information for MVs of a picture). FIG. 8 focuses on decoder-side processing; an encoder performs corresponding signaling.

D. DMV Encoding Techniques

An encoder such as the encoder (300) of FIG. 3 optionally uses either extended range variable length coding or default range variable length coding for DMV information. For example, the encoder performs the technique (900) shown in FIG. 9A to encode a DMV.

The encoder determines (910) whether or not to use extended range variable length coding for a DMV component. For example, the encoder checks whether extended VLC range is to be used for horizontal or vertical DMV components for MVs of a current predicted picture. Alternatively, the decisions of whether and how to use extended VLC range are made at some other level (e.g., per entry point, per slice, per MV).

If extended range variable length coding is used for the DMV component (the "yes" path out of decision 912), the encoder uses (920) extended range variable length coding for the DMV component. Otherwise (the "no" path out of decision 912), the encoder uses (930) default range variable length coding for the DMV component. For example, the encoder uses one of the variable length coding techniques described above for the DMV component. Alternatively, the encoder uses another variable length coding technique.

If there is another DMV component to be encoded for the DMV (the "yes" path out of decision 940), the encoder determines (910) whether or not to use extended range variable length coding for that other DMV component, etc. Thus, for example, the encoder encodes a horizontal DMV component for the DMV then encodes a vertical DMV component for the DMV. Alternatively, a single decision whether to use extended VLC range applies to both horizontal and vertical DMV components. After both DMV components of the DMV have been encoded (the "no" path out of decision 940), the technique (900) ends.

Figure 9A:
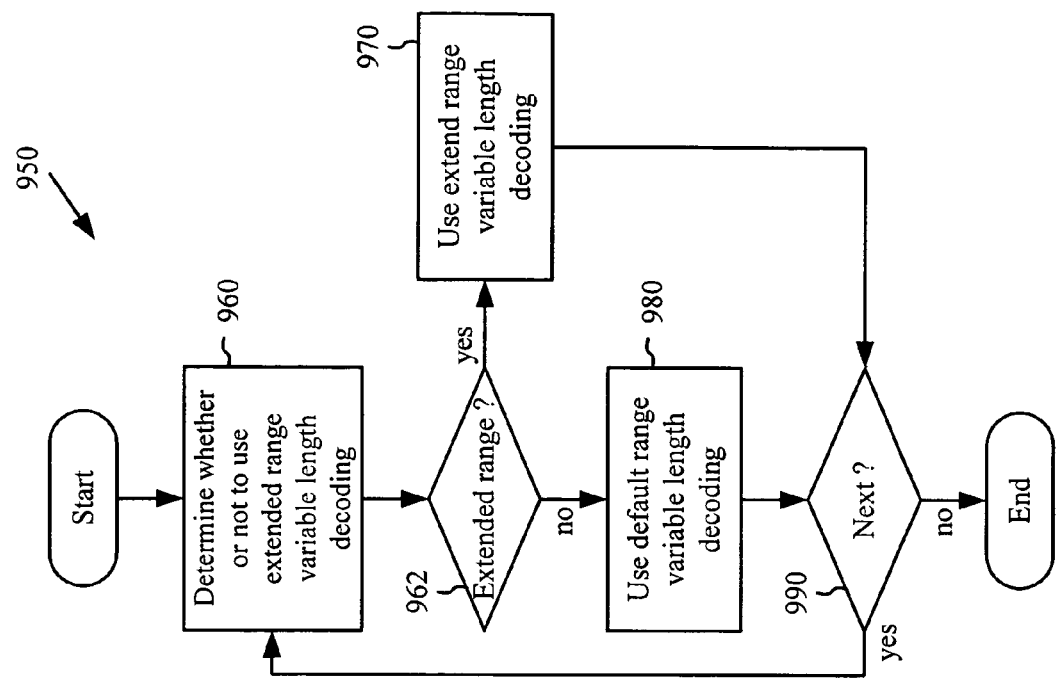
FIGS. 9A and 9B are flowcharts showing techniques for extended range variable length coding and decoding, respectively, of DMVs.

For the sake of simplicity, FIG. 9A does not show the various ways in which the technique (900) may be integrated with other aspects of encoding and decoding.

E. DMV Decoding Techniques

A decoder such as the decoder (400) of FIG. 4 optionally uses either extended range variable length decoding or default range variable length decoding for DMV information. For example, the decoder performs the technique (950) shown in FIG. 9B to decode a DMV.

The decoder determines (960) whether or not to use extended range variable length decoding for a DMV component. For example, the decoder checks whether extended VLC range is to be used for horizontal or vertical DMV components for MVs of a current predicted picture. Alternatively, the decisions of whether and how to use extended VLC range are made at some other level (e.g., per entry point, per slice, per MV).

If extended range variable length decoding is used for the DMV component (the "yes" path out of decision 962), the decoder uses (970) extended range variable length decoding for the DMV component. Otherwise (the "no" path out of decision 962), the decoder uses (980) default range variable length decoding for the DMV component. For example, the decoder uses one of the variable length decoding techniques described above for the DMV component. Alternatively, the decoder uses another variable length decoding technique.

If there is another DMV component to be decoded for the DMV (the "yes" path out of decision 990), the decoder determines (960) whether or not to use extended range variable length decoding for that other DMV component, etc. Thus, for example, the decoder decodes a horizontal DMV component for the DMV then decodes a vertical DMV component for the DMV. Alternatively, a single decision whether to use extended VLC range applies to both horizontal and vertical DMV components. After both DMV components of the DMV have been decoded (the "no" path out of decision 990), the technique (950) ends.

Figure 9B:
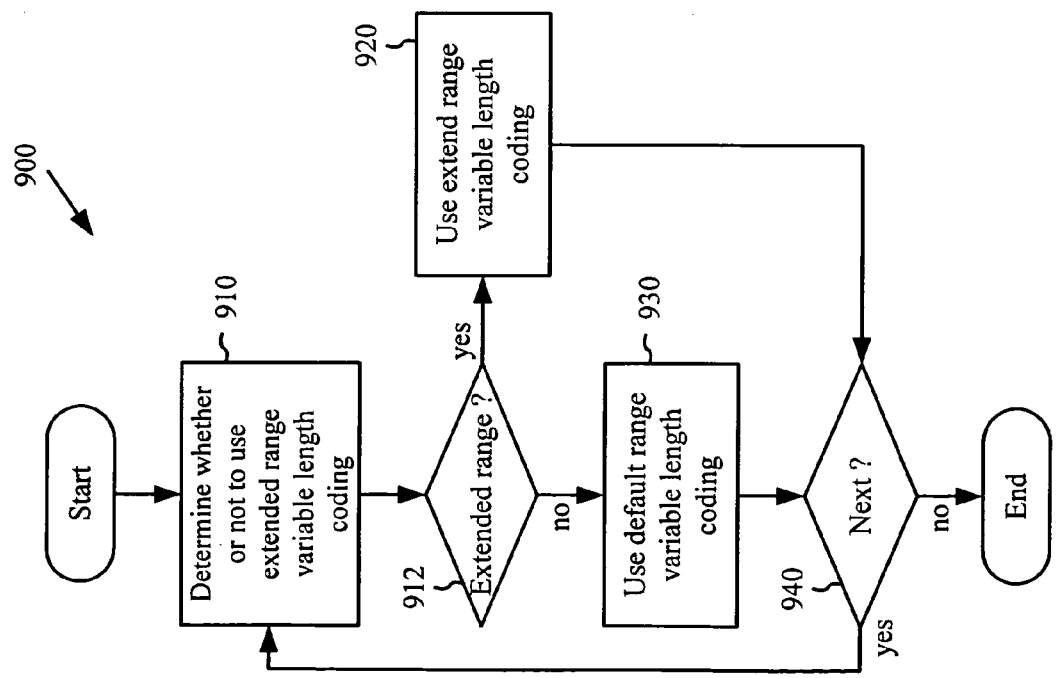

For the sake of simplicity, FIG. 9B does not show the various ways in which the technique (950) may be integrated with other aspects of encoding and decoding.

IV. Combined Implementation

A detailed combined implementation for a bitstream syntax, semantics, and decoder is now described. Although some emphasis is put on interlaced P-fields, in various places in this section, the applicability of syntax elements, semantics, and decoding to other picture types (e.g., interlaced P- and B-frames, interlaced B-fields) is addressed.

A. Sequence and Semantics in the Combined Implementation

In the combined implementation, a compressed video sequence is made up of data structured into hierarchical layers: the picture layer, macroblock layer, and block layer. A sequence layer precedes the sequence, and entry point layers may be interspersed in the sequence. FIGS. 10A through 10E show the bitstream elements that make up various layers.

1. Sequence Layer Syntax and Semantics

A sequence-level header contains sequence-level parameters used to decode the sequence of compressed pictures. In some profiles, the sequence-related metadata is communicated to the decoder by the transport layer or other means. For another profile (the advanced profile), however, this header syntax is part of the video data bitstream.

Figure 10A:
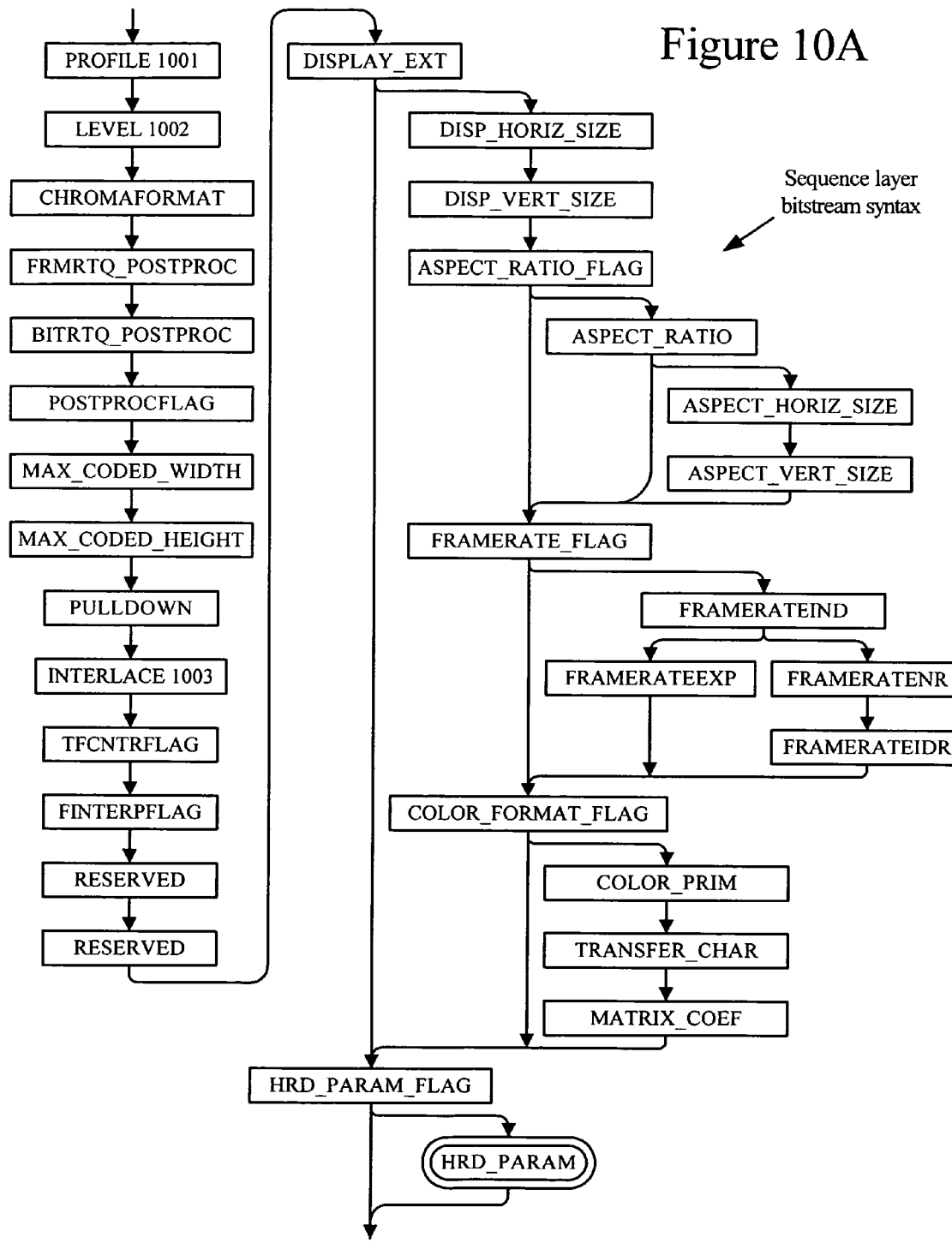
FIGS. 10A-10E are syntax diagrams for layers of a bitstream according to a combined implementation.

FIG. 10A shows the syntax elements that make up the sequence header for the advanced profile. The PROFILE (1001) and LEVEL (1002) elements specify the profile used to encode the sequence and the encoding level in the profile, respectively. The INTERLACE (1003) element is a one-bit syntax element that signals whether the source content is progressive (INTERLACE=0) or interlaced (INTERLACE=1). The individual frames may still be coded using the progressive or interlaced syntax when INTERLACE=1.

2. Entry-point Layer Syntax and Semantics

An entry-point header is present in the advanced profile. The entry point has two purposes. First, it is used to signal a random access point within the bitstream. Second, it is used to signal changes in the coding control parameters.

Figure 10B:
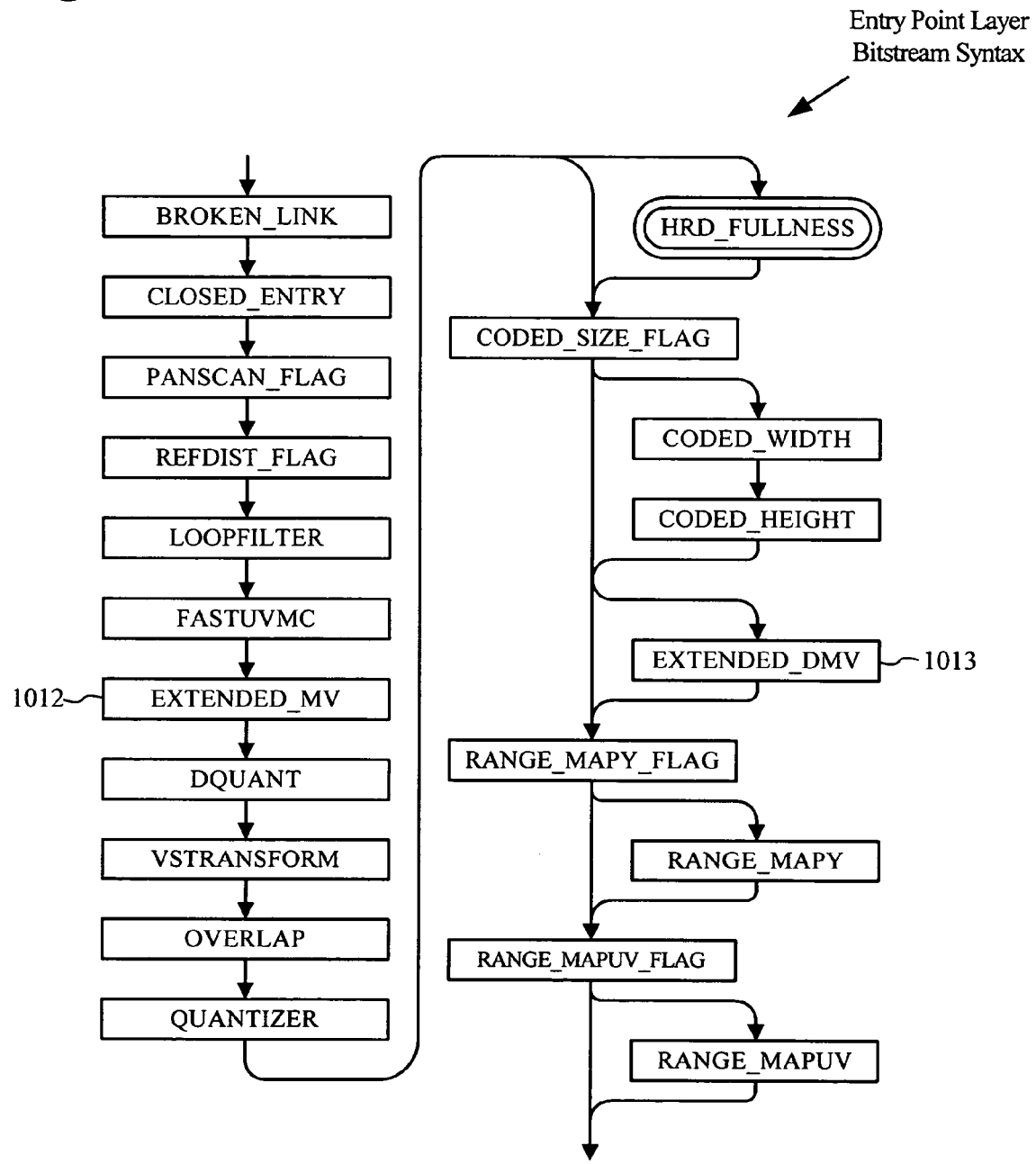

FIG. 10B shows the syntax elements that make up the entry-point layer. Of particular interest, the extended MV flag EXTENDED_MV (1012) element is a one-bit element that indicates whether extended MV capability is turned on (EXTENDED_MV=1) or off (EXTENDED_MV=0). The extended DMV range flag EXTENDED_DMV (1013) element is a one-bit syntax element that is present if EXTENDED_MV=1. If EXTENDED_DMV=1, whether and how to use DMVs in an extended DMV range are signaled at the picture layer within the entry point segment. If EXTENDED_DMV=0, DMVs in the extended DMV range are not signaled. Extended DMV range is an option for interlaced P- and B-pictures, including interlaced P-fields and P-frames and interlaced B-fields and B-frames.

3. Picture Layer Syntax and Semantics

Figure 10C:
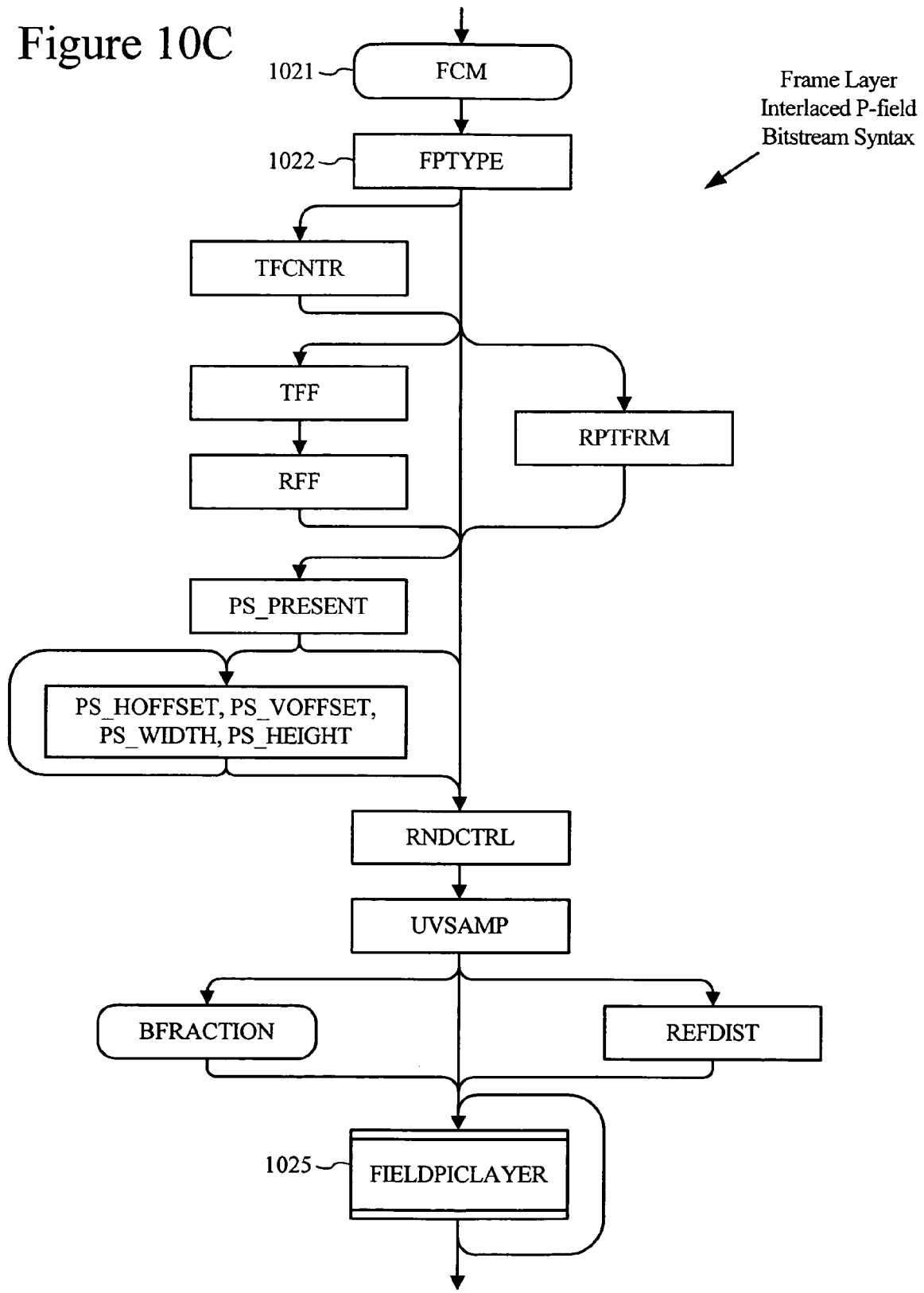

Data for a picture consists of a picture header followed by data for the macroblock layer. FIG. 10C shows the bitstream elements that make up the frame header for interlaced field pictures. In the following description, emphasis is placed on elements used with interlaced P-fields, but the header shown in FIG. 10C is applicable to various combinations of interlaced I-, P-, B-, and BI-fields.

The frame coding mode FCM (1021) element is present only in the advanced profile and only if the sequence layer INTERLACE (1003) has the value 1. FCM (1021) indicates whether the picture is coded as progressive, interlace-field or interlace-frame. The table in FIG. 11A includes the VLCs used to indicate picture coding type with FCM.

The field picture type FPTYPE (1022) element is a three-bit syntax element present in picture headers for interlaced field pictures. FPTYPE is decoded according to the table in FIG. 11B. As the table shows, an interlaced frame may include two interlaced I-fields, one interlaced I-field and one interlaced P-field, two interlaced P-fields, two interlaced B-fields, one interlaced B-field and one interlaced BI-field, or two interlaced BI-fields.

Figure 10D:
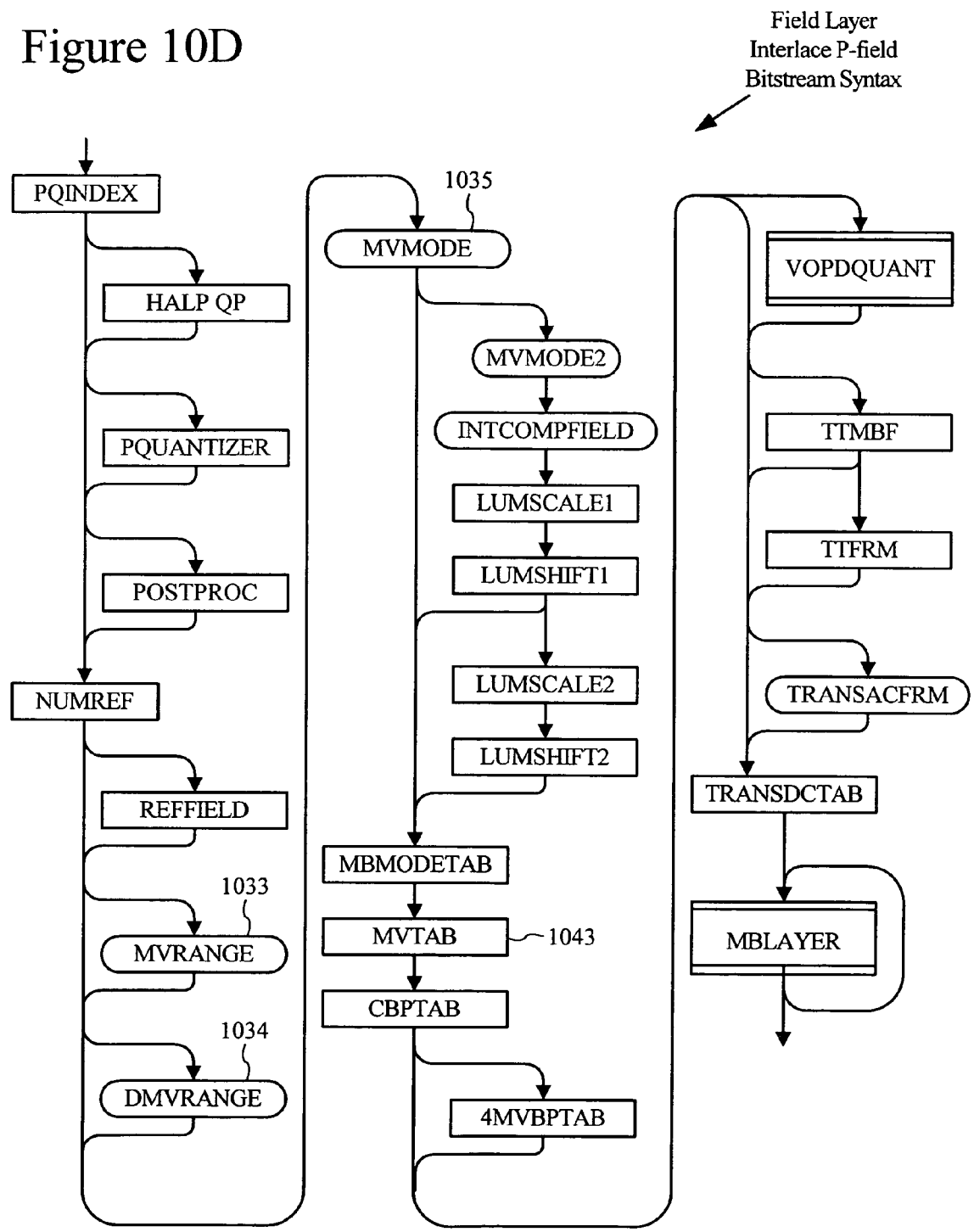

The field picture layer FIELDPICLAYER (1025) element is data for one of the separate interlaced fields of the interlaced frame. If the interlaced frame is a P/P frame (FP-TYPE=011), the bitstream includes two FIELDPICLAYER (1025) elements for the two interlaced P-fields. FIG. 10D shows the bitstream elements that make up the field picture header for an interlaced P-field picture.

The extended MV range flag MVRANGE (1033) is a variable-size syntax element that, in general, indicates an extended range for MVs (i.e., longer possible horizontal and/or vertical displacements for the MVs). The extended DMV range flag DMVRANGE (1034) is a variable-size syntax element present if EXTENDED_DMV=1. The table in FIG. 11C is used for the DMVRANGE (1034) element. Both MVRANGE (1033) and DMVRANGE (1034) are used in decoding DMVs, and extended DMV range is an option for interlaced P-fields, interlaced P-frames, interlaced B-fields and interlaced B-frames.

The MV mode MVMODE (1035) element is a variable-size syntax element that signals one of four MV coding modes or one intensity compensation mode. The MV table MVTAB (1043) element is a fixed-length field that indicates which of multiple code tables is used to decode MV data.

An interlaced P-frame header (not shown) has many of the same elements as the field-coded interlaced frame header shown in FIG. 10C and the interlaced P-field header shown in FIG. 10D. These include FCM (1021), MVRANGE (1033), DMVRANGE (1034), and MVTAB (1043), although the exact syntax and semantics for interlaced P-frames may differ from interlaced P-fields. Interlaced B-fields and interlaced B-frames also have many of the same elements as interlaced P-fields, including the MVRANGE (1033) and DMVRANGE (1034) elements.

4. Macroblock Layer Syntax and Semantics

Figure 10E:
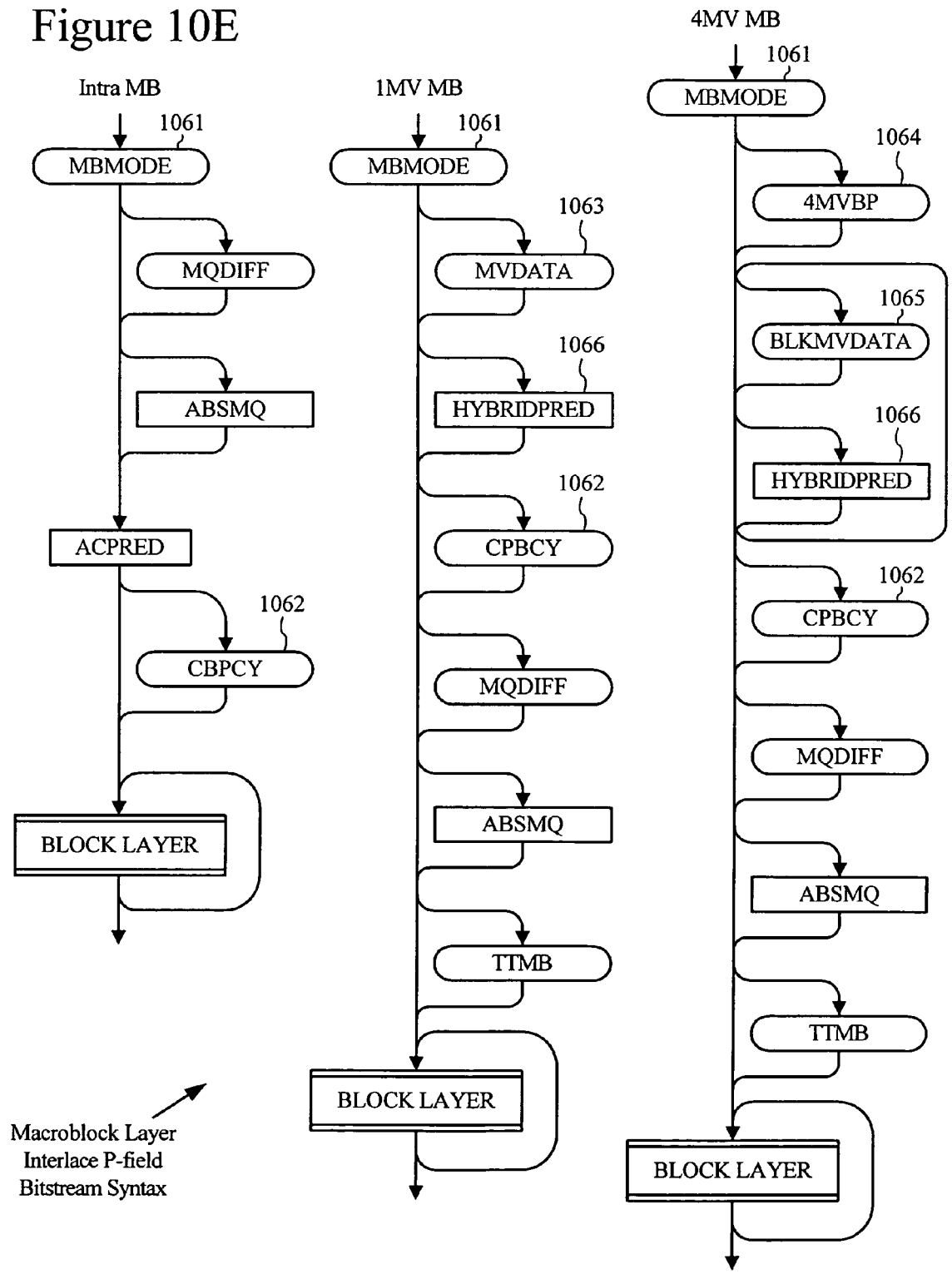

Data for a macroblock consists of a macroblock header followed by the block layer. FIG. 10E shows the macroblock layer structure for interlaced P-fields.

The macroblock mode MBMODE (1061) element is a variable-size element. It jointly indicates information such as the number of MVs for a macroblock (1 MV, 4 MV, or intra), whether a coded block pattern CBPCY (1062) element is present for the macroblock, and (in some cases) whether DMV data is present for the macroblock.

The MV data MVDATA (1063) element is a variable-size element that encodes MV information (e.g., horizontal and vertical differentials) for a MV. For an interlaced P-field with two reference fields, MVDATA (1063) also encodes information for selecting between multiple possible MV predictors for the MV. The block-level MV data BLKMVDATA (1065) element is a variable-size element present in certain situations. It contains motion information for a block of a macroblock. Interlaced P-frames, interlaced B-fields, and interlaced B-frames use syntax elements the same as or similar to MVDATA and BLKMVDATA to signal DMV information.

In macroblocks for interlaced P-fields, B-fields, and P-frames, the 4 MVBP (1064) element is present if MBMODE (1061) indicates that the macroblock has 4 MVs. 4 MVBP (1064) indicates which of the 4 luma blocks contain non-zero DMVs. In interlaced P-frame macroblocks, the 2 MVBP element (not shown) is present if MBMODE (1061) indicates that the macroblock has 2 field MVs. 2 MVBP indicates which of the 2 fields (top and bottom) contain non-zero DMVs.

5. Block Layer Syntax and Semantics

The block layer for interlaced pictures follows the syntax and semantics of the block layer for progressive pictures. In general, information for DC and AC coefficients of blocks and sub-blocks is signaled at the block layer.

B. Decoding in the Combined Implementation

When a video sequence consists of interlaced video frames or includes a mix of interlaced and progressive frames, the FCM (1021) element indicates whether a given picture is coded as a progressive frame, interlaced fields or an interlaced frame. For a frame coded as interlaced fields, FPTYPE (1022) indicates whether the frame includes two interlaced I-fields, one interlaced I-field and one interlaced P-field, two interlaced P-fields, two interlaced B-fields, one interlaced B-field and one interlaced BI-field, or two interlaced BI-fields. Decoding of the interlaced fields follows.

1. Macroblock Modes

Macroblocks in interlaced P-fields may be one of 3 possible types: 1 MV, 4 MV, and intra. The MBMODE (1061) element indicates the macroblock type (1 MV, 4 MV or intra) and also the presence of the CBP and MV data.

A 1 MV macroblock is one where a single MV represents the displacement between the current and reference pictures for all 6 blocks in the macroblock. For a 1 MV macroblock, the MBMODE (1061) element indicates three things: (1) that the macroblock type is 1 MV; (2) whether the CBPCY (1062) element is present for the macroblock; and (3) whether the MVDATA (1063) element is present for the macroblock. The MVDATA (1063) element encodes the DMV, which is combined with the MV predictor to reconstruct the MV. If the MBMODE (1061) element indicates that the MVDATA (1063) element is not present, then the DMV is assumed to be zero and therefore the MV is equal to the MV predictor.

A 4 MV macroblock is one where each of the 4 luma blocks in the macroblock may have an associated MV that indicates the displacement between the current and reference pictures for that block. The displacement for the chroma blocks is derived from the 4 luma MVs. The difference between the current and reference blocks is encoded in the block layer. For a 4 MV macroblock, the MBMODE (1061) element indicates two things: (1) that the macroblock type is 4 MV; and (2) whether the CBPCY (1062) element is present.

An intra macroblock is one where all six blocks are coded without referencing any previous picture data.

Interlaced P-frame, interlaced B-fields, and interlaced B-frames use other syntax elements to indicate macroblock modes and the presence/absence of MV information.

2. MV Block Patterns

The 4 MVBP (1064) element indicates which of the 4 luma blocks of a 4 MV macroblock contain non-zero DMVs. 4 MVBP (1064) decodes to a value between 0 and 15, which when expressed as a binary value represents a bit syntax element that indicates whether the MV for the corresponding luma block is present.

A field-coded macroblock in an interlaced P-frame or interlaced B-frame may include 2 MVs. In the case of 2 field MV macroblocks, the 2 MVBP element indicates which of the two fields have non-zero DMVs.

3. Decoding DMVs

The MVDATA (1063) and BLKMVDATA (1065) elements encode motion information for the macroblock or blocks in the macroblock. 1 MV macroblocks have a single MVDATA (1063) element, and 4 MV macroblocks may have between zero and four BLKMVDATA (1065). The process of computing a DMV from MVDATA (1063) or BLKMVDATA (1065) is different for the one-reference (NUMREF=0) case and two-reference (NUMREF=1) case.

In field pictures that have only one reference field, each MVDATA (1063) or BLKMVDATA (1065) syntax element jointly encodes two things: (1) the horizontal DMV component; and 2) the vertical DMV component. The MVDATA (1063) or BLKMVDATA (1065) element is a VLC followed by a FLC. The value of the VLC determines the size of the FLC. The MVTAB (1043) syntax element specifies the table used to decode the VLC.

FIG. 12A shows pseudocode that illustrates DMV decoding for MVs of blocks or macroblocks in field pictures that have one reference field. In the pseudocode, the values dmv_x and dmv_y are computed, where dmv_x is the horizontal DMV component and dmv_y is the vertical DMV component. The variables k_x and k_y are fixed length values that depend on the MV range as defined by MVRANGE (1033) according to the table shown in FIG. 12B.

The variable extend_x is for an extended VLC range horizontal DMV, and the variable extend_y is for an extended VLC range vertical DMV. The variables extend_x and extend_y are derived from the DMVRANGE (1034) syntax element. If DMVRANGE (1034) indicates that extended VLC range for the horizontal component is used, then extend_x=1. Otherwise extend_x, =0. Similarly, if DMVRANGE (1034) indicates that extended VLC range for the vertical component is used, then extend_y=1. Otherwise, extend_y=0. The offset_table is an array defined as follows:

offset_table1[9]={0, 1, 2, 4, 8, 16, 32, 64, 128,}, and offset_table2[9]={0, 1, 3, 7, 15, 31, 63, 127, 255}, where the offset_table2[ ] is used for a horizontal or vertical component when the differential VLC range is extended for that component. Although FIGS. 12A and 12B show extended VLC range decoding for DMVs of interlaced P-fields, extended VLC range decoding is also used for DMVs of interlaced B-fields, interlaced P-frames, and interlaced B-frames in the combined implementation.

In field pictures that have two reference fields, each MVDATA (1063) or BLKMVDATA (1065) syntax element jointly encodes three things: (1) the horizontal DMV component; (2) the vertical DMV component; and (3) whether the dominant or non-dominant predictor is used, i.e., which of the two fields is referenced by the MV. As in the one reference field case, the MVDATA (1063) or BLKMVDATA (1065) element is a VLC followed by a FLC, the value of the VLC determines the size of the FLC, and the MVTAB (1043) syntax element specifies the table used to decode the VLC.

FIG. 12C shows pseudocode that illustrates DMV and dominant/non-dominant predictor decoding for MVs of blocks or macroblocks in field pictures that have two reference fields. In the pseudocode, the value predictor_flag is a binary flag indicating whether the dominant or non-dominant MV predictor is used. If predictor_flag=0, the dominant predictor is used, and if predictor_flag=1, the non-dominant predictor is used. Various other variables (including dmv_x, dmv_y, k_x, k_y, extend_x, extend_y, offset_table1[ ], and offset_table2[ ]) are as described for the one reference field case. The table size_table is an array defined as follows:

size_table[16]={0, 0, 1, 1, 2, 2, 3, 3, 4, 4, 5, 5, 6, 6, 7, 7}.

4. MV Prediction, Reconstruction, Etc.

A MV is computed by adding the DMV computed in the previous section to a MV predictor. The predictor is computed from up to three neighboring MVs. For both 1 MV and 4 MV macroblocks, a luma MV is reconstructed by adding the differential to the predictor as follows, where the variables range_x and range_y depend on MVRANGE (1033) and are specified in the table shown in FIG. 12B. For NUMREF=0 (one reference field interlaced P-field):

mv_x=(dmv_x+predictor_x) smod range_x, and mv_y=(dmv_y+predictor_y) smod (range_y).

For NUMREF=1 (two reference field interlaced P-field):

mv_x=(dmv_x+predictor_x) smod range_x, and mv_y=(dmv_y+predictor_y) smod (range_y/2).

Chroma MVs are derived from the luma MVs.

Having described and illustrated the principles of our invention with reference to various embodiments, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. In a computing device that implements a video decoder, a method comprising:
   with the computing device that implements the video decoder, determining whether or not to use an extended range variable length decoding mode, wherein:
      a default range variable length decoding mode uses variable length decoding for a default range of possible differential motion vector values and uses escape mode decoding for those of the possible differential motion vector values outside the default range; and
      the extended range variable length decoding mode uses variable length decoding for an extended range of the possible differential motion vector values and uses escape mode decoding for those of the possible differential motion vector values outside the extended range, the extended range including at least some of the possible differential motion vector values outside the default range;
   when the extended range variable length decoding mode is used, with the computing device that implements the video decoder, decoding a differential motion vector in the extended range variable length decoding mode; and
   otherwise, with the computing device that implements the video decoder, decoding the differential motion vector in the default range variable length decoding mode.

2. The method of claim 1 wherein a horizontal component and a vertical component of the differential motion vector are each decoded in the extended range variable length decoding mode.

3. The method of claim 1 wherein a horizontal component of the differential motion vector is decoded in the extended range variable length decoding mode, and wherein a vertical component of the differential motion vector is decoded in the default range variable length decoding mode.

4. The method of claim 1 wherein a horizontal component of the differential motion vector is decoded in the default range variable length decoding mode, and wherein a vertical component of the differential motion vector is decoded in the extended range variable length decoding mode.

5. The method of claim 1 wherein the extended range variable length decoding mode and the default range variable length decoding mode use different offset tables.

6. The method of claim 1 wherein the determining affects how many bits are retrieved for the differential motion vector.

7. The method of claim 1 wherein, for the extended range variable length decoding mode, one or more extra bits are signaled per component of the differential motion vector, compared to the default range variable length decoding mode.

8. The method of claim 1 wherein the extended range is substantially double the default range.

9. The method of claim 1 wherein the decoding comprises:
determining a first code length for a horizontal component of the differential motion vector based at least in part on a variable length code, wherein the first code length increases by one in the extended range variable length decoding mode; and
determining a second code length for a vertical component of the differential motion vector based at least in part on the variable length code, wherein the second code length increases by one in the extended range variable length decoding mode.

10. In a computing device that implements a video decoder, a method comprising:
with the computing device that implements the video decoder, parsing a syntax element that indicates whether or not extended range variable length decoding of differential motion vectors is possible for plural video pictures;
if so, then with the computing device that implements the video decoder performing additional processing that allows use of extended range variable length decoding of differential motion vectors for the plural video pictures, wherein:
default range variable length decoding of differential motion vectors uses first thresholds between non-escape mode decoding and escape mode decoding, the first thresholds defining a default range; and
the extended range variable length decoding uses second thresholds defining an extended range larger than the default range such that escape mode decoding is used for fewer possible differential motion vector values; and
otherwise, skipping the additional processing.

11. The method of claim 10 wherein the syntax element is signaled at entry point layer.

12. The method of claim 10 further comprising, with the computing device that implements the video decoder, parsing a second syntax element that indicates whether or not extended range motion vectors are possible for the plural video pictures.

13. The method of claim 10 wherein the additional processing includes, for each of the plural video pictures, with the computing device that implements the video decoder, parsing a second syntax element that indicates whether or not extended range variable length decoding of differential motion vectors is used for the picture.

14. The method of claim 13 wherein the second syntax element jointly indicates whether or not extended range variable length decoding of differential motion vectors is used for (a) horizontal components and (b) vertical components, wherein the video decoder decides whether to use extended range variable length decoding for the horizontal components independently from whether to use extended range variable length decoding for the vertical components.

15. In a computing device that implements a video decoder, a method comprising:
with the computing device that implements the video decoder, decoding a variable length code for information that jointly indicates whether or not extended range variable length decoding is used for (a) horizontal differential motion vector components and (b) vertical differential motion vector components, wherein the video decoder decides whether to use components independently from whether to use extended range variable length decoding for the vertical differential motion vector components; and
with the computing device that implements the video decoder, decoding one or more differential motion vectors based at least in part on the decoded variable length code.

16. The method of claim 15 wherein the variable length code is signaled at picture layer.

17. In a computing device that implements a video encoder, a method comprising:
with the computing device that implements the video encoder, signaling a syntax element that indicates whether or not extended range variable length decoding of differential motion vectors is possible for plural video pictures;
if the syntax element indicates that extended range variable length decoding of differential motion vectors is possible, then with the computing device that implements the video encoder performing additional processing that allows use of extended range variable length decoding of differential motion vectors for the plural video pictures, wherein:
default range variable length decoding of differential motion vectors uses first thresholds between non-escape mode decoding and escape mode decoding, the first thresholds defining a default range; and
the extended range variable length decoding uses second thresholds defining an extended range larger than the default range such that escape mode decoding is used for fewer possible differential motion vector values; and
otherwise, skipping the additional processing.

18. The method of claim 17 wherein the syntax element is signaled at entry point layer.

19. The method of claim 17 wherein the additional processing includes, for each of the plural video pictures, with the computing device that implements the video encoder, signaling a variable length code at picture layer for information that jointly indicates whether or not extended range variable length decoding of differential motion vectors is used for horizontal and vertical components.

20. The method of claim 17 wherein the additional processing includes, for a differential motion vector:
when extended range variable length coding of differential motion vectors is used, with the computing device that implements the video encoder, encoding one or both of a horizontal component and a vertical component with extended range variable length coding; and
otherwise, with the computing device that implements the video encoder, encoding both the horizontal component and the vertical component with default range variable length coding.

21. The method of claim 1 wherein the determining whether or not to use the extended range variable length decoding mode comprises:
with the computing device that implements the video decoder, receiving a first flag that indicates whether extended motion vector range capability is on or off; and
if the extended motion vector range capability is on, with the computing device that implements the video decoder, receiving a second flag that indicates whether extended range differential motion vector coding capability is on or off.

22. The method of claim 21 wherein the first flag and second flag are signaled at entry point layer.

23. The method of claim 21 further comprising, for each of plural pictures:
   if the extended motion vector range capability is on, with the computing device that implements the video decoder, receiving a third flag that indicates whether extended motion vector range is on or off; and
   if the extended range differential motion vector coding capability is on, with the computing device that implements the video decoder, receiving a fourth flag that indicates whether or not to use the extended range variable length decoding mode.

24. The method of claim 1 wherein the determination of whether or not to use the extended range variable length decoding mode is independent of motion vector range.

25. In a computing device that implements a video decoder, a method comprising:
   with the computing device that implements the video decoder, determining whether or not to use an extended range variable length decoding mode;
   when the extended range variable length decoding mode is used, with the computing device that implements the video decoder, decoding a differential motion vector in the extended range variable length decoding mode, including:
      determining a first code length for a horizontal component of the differential motion vector based at least in part on a variable length code, wherein the first code length increases by one in the extended range variable length decoding mode; and
      determining a second code length for a vertical component of the differential motion vector based at least in part on the variable length code, wherein the second code length increases by one in the extended range variable length decoding mode; and
   otherwise, with the computing device that implements the video decoder, decoding the differential motion vector in a default range variable length decoding mode.

* * * * *

UNITED STATES PATENT AND TRADEMARK OFFICE
CERTIFICATE OF CORRECTION

PATENT NO. : 7,577,200 B2
APPLICATION NO. : 10/960373
DATED : August 18, 2009
INVENTOR(S) : Holcomb et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1292 days.

Signed and Sealed this

Seventh Day of September, 2010

David J. Kappos
*Director of the United States Patent and Trademark Office*